United States Patent
Ishii et al.

(10) Patent No.: US 10,924,187 B2
(45) Date of Patent: Feb. 16, 2021

(54) OPTICAL TRANSCEIVER WITH A PLURALITY OF BUILT-IN OPTICAL SUBASSEMBLIES

(71) Applicant: SUMITOMO ELECTRIC INDUSTRIES, LTD., Osaka (JP)

(72) Inventors: Kuniyuki Ishii, Osaka (JP); Hiromi Kurashima, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/376,716

(22) Filed: Apr. 5, 2019

(65) Prior Publication Data
US 2019/0312645 A1     Oct. 10, 2019

(30) Foreign Application Priority Data
Apr. 5, 2018 (JP) .............................. JP2018-073173

(51) Int. Cl.
*H04B 10/40* (2013.01)
*H04J 14/04* (2006.01)
*H04B 10/2575* (2013.01)

(52) U.S. Cl.
CPC ....... *H04B 10/40* (2013.01); *H04B 10/25759* (2013.01); *H04J 14/04* (2013.01)

(58) Field of Classification Search
None
See application file for complete search history.

(56) References Cited

U.S. PATENT DOCUMENTS

| 5,943,461 A * | 8/1999 | Shahid ................. G02B 6/4246 285/24 |
| 9,229,167 B2 * | 1/2016 | Chang .................. G02B 27/123 |
| 2005/0084268 A1 * | 4/2005 | Weigert ............... G02B 6/4246 398/135 |
| 2005/0084269 A1 * | 4/2005 | Dallesasse ........... G02B 6/4204 398/135 |
| 2005/0196110 A1 * | 9/2005 | Aronson ............... G02B 6/266 385/92 |
| 2008/0095541 A1 * | 4/2008 | Dallesasse ............ H04B 10/40 398/191 |

(Continued)

FOREIGN PATENT DOCUMENTS

JP        2016057567 A       4/2016

*Primary Examiner* — Jai M Lee
(74) *Attorney, Agent, or Firm* — Baker Botts L.L.P.; Michael A. Sartori

(57) ABSTRACT

An optical transceiver includes: a first OSA and a second OSA; a circuit board; an optical multiplexer/demultiplexer which includes a plurality of internal fibers, is optically connected to each of the first OSA and the second OSA through each of the internal fibers, and multiplexes the single optical signal to generate an optical transmission signal or demultiplexes an optical reception signal to generate the single optical signal; a receptacle which is optically connected to the optical multiplexer/demultiplexer, transmits the optical transmission signal to the outside, and receives the optical reception signal; and a second holding member which holds the first OSA and the second OSA and is engaged with the circuit board. The second holding member includes a first guide which guides the internal fiber and a second guide which detours the internal fiber with respect to the first guide.

5 Claims, 20 Drawing Sheets

(56) References Cited

U.S. PATENT DOCUMENTS

| | | | |
|---|---|---|---|
| 2008/0292322 A1* | 11/2008 | Daghighian | H04B 10/40 398/192 |
| 2011/0103797 A1* | 5/2011 | Oki | G02B 6/4243 398/79 |
| 2012/0237171 A1* | 9/2012 | Oki | G02B 6/4277 385/78 |
| 2012/0237223 A1* | 9/2012 | Matsui | G02B 6/4274 398/82 |
| 2013/0022360 A1* | 1/2013 | Matsui | G02B 6/4201 398/116 |
| 2015/0055960 A1* | 2/2015 | Zheng | H04B 10/40 398/135 |
| 2015/0078760 A1* | 3/2015 | Kurashima | H04B 10/801 398/139 |
| 2017/0048015 A1* | 2/2017 | O'Daniel | H04B 10/40 |
| 2017/0139160 A1* | 5/2017 | Noguchi | G01J 1/44 |
| 2018/0052289 A1* | 2/2018 | Lin | G02B 6/2938 |
| 2018/0172933 A1* | 6/2018 | Noguchi | G02B 6/4215 |
| 2018/0231726 A1* | 8/2018 | Mizuno | H04B 10/505 |
| 2018/0254831 A1* | 9/2018 | Ishii | H04B 10/40 |

* cited by examiner

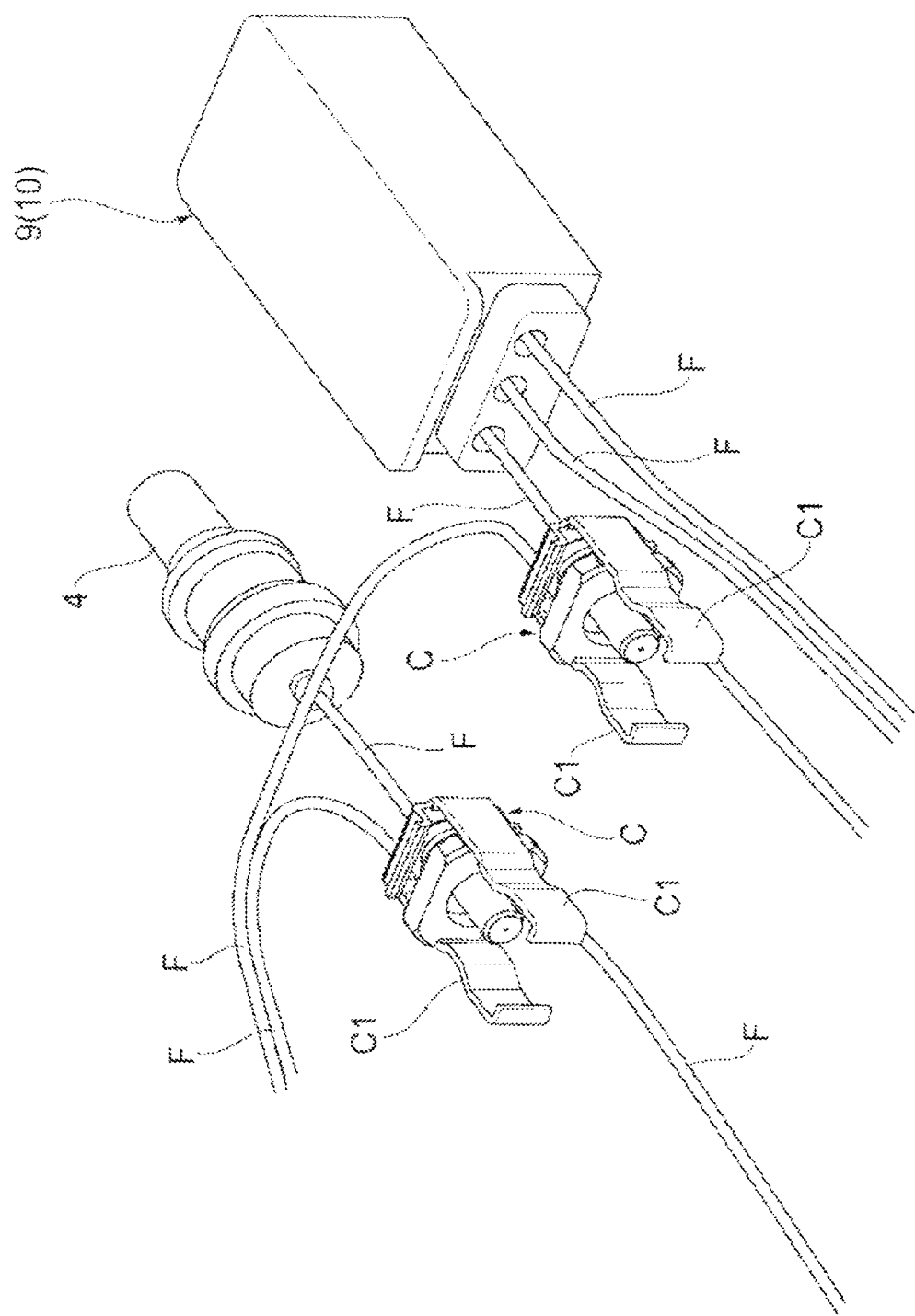

US 10,924,187 B2

OPTICAL TRANSCEIVER WITH A PLURALITY OF BUILT-IN OPTICAL SUBASSEMBLIES

TECHNICAL FIELD

One aspect of the present disclosure relates to an optical transceiver.

BACKGROUND

Japanese Unexamined Patent Publication No. 2016-57567 describes an optical transceiver which is provided with a printed circuit board having a plate-like shape, an ROSA, a TOSA, and a housing which houses the printed circuit board, the ROSA, and the TOSA therein. The optical transceiver is provided with four TOSAs which are disposed parallel to each other and one ROSA. The printed circuit board is disposed on the back side of the four TOSAs and the ROSA. Each of the TOSAs and the ROSA is connected to the printed circuit board through an FPC. The FPC is attached by soldering.

SUMMARY

An optical transceiver according to one aspect of the present disclosure includes: a plurality of optical subassemblies each configured to perform photoelectric conversion between a single optical signal and a single electric signal; a circuit board including a circuit mounted thereon, the circuit being electrically connected to each of the optical subassemblies; an optical multiplexer/demultiplexer including a plurality of internal fibers, the optical multiplexer/demultiplexer being optically connected to each of the optical subassemblies through each of the internal fibers and configured to multiplex the single optical signal to generate an optical transmission signal or demultiplex an optical reception signal to generate the single optical signal; a receptacle optically connected to the optical multiplexer/demultiplexer and configured to transmit the optical transmission signal to the outside and receive the optical reception signal; and a holding member configured to hold the optical subassemblies and engaged with the circuit board. The holding member includes a first guide configured to guide at least any one of the internal fibers and a second guide configured to detour at least any one of the internal fibers different from the at least one internal fiber guided by the first guide with respect to the first guide.

BRIEF DESCRIPTION OF THE DRAWINGS

FIG. 12 is a perspective view of the optical multiplexer (optical demultiplexer), internal fibers, and simple connectors.

DETAILED DESCRIPTION

An example of the optical transceiver according to an embodiment of the present disclosure will be described below with reference to the drawings. Note that the present invention is not limited to the following examples, and it is intended that the present invention is defined by the claims and includes all changes within the range equivalent to the claims. In the following description, identical or corresponding elements are designated by the same reference signs throughout the drawings to appropriately omit redundant description. Further, each drawing may be partially simplified or exaggerated to facilitate understanding, and the dimension ratio is not limited to the ratio described in each drawing.

Figure 1:
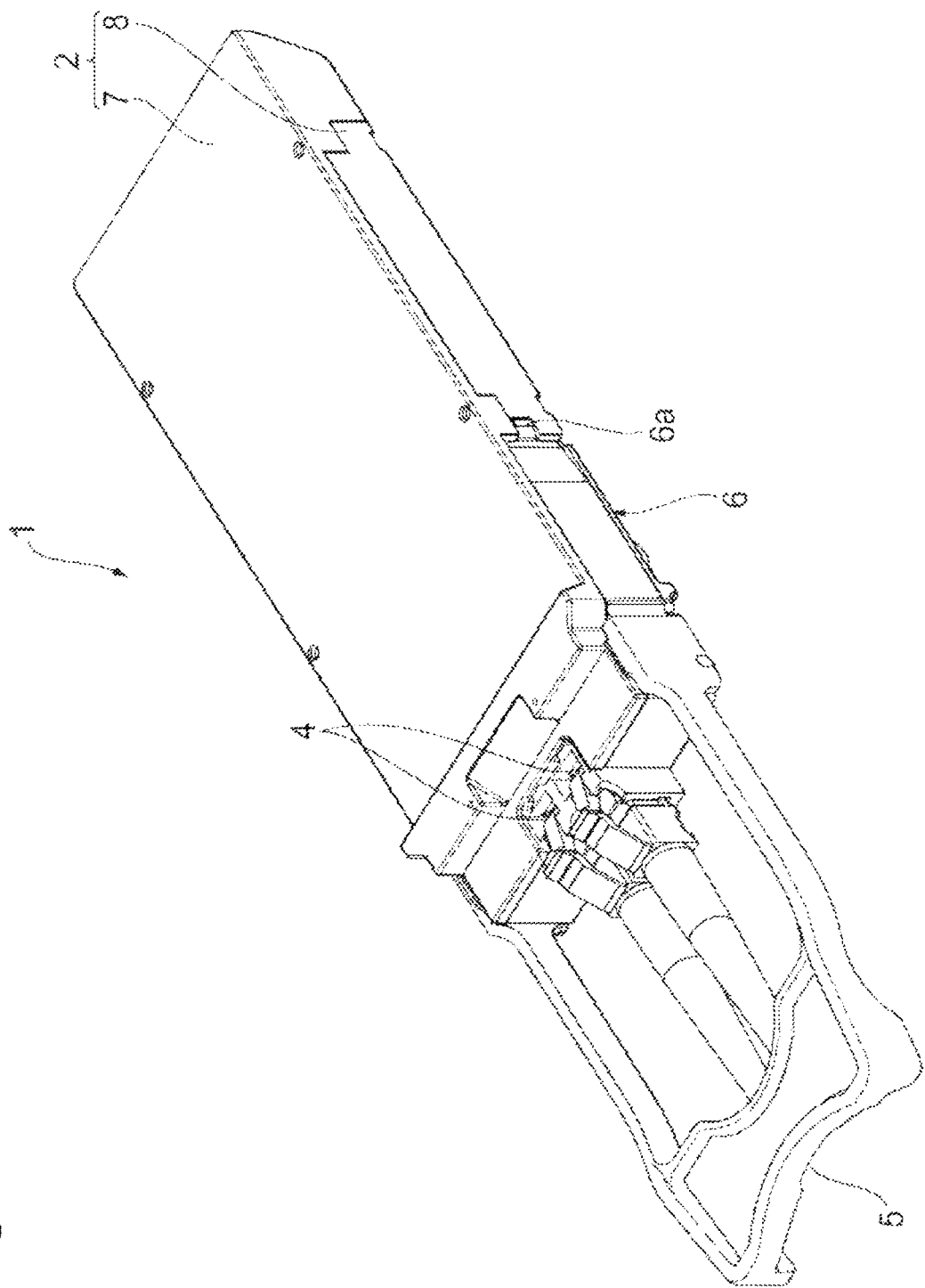
FIG. 1 is a perspective view of an optical transceiver according to one embodiment of the present disclosure.

FIG. 1 is a perspective view of an optical transceiver 1 according to the embodiment. The optical transceiver 1 is a so-called CFP8 module. The standard specification of the CFP8 module is defined in the industry. In the optical transceiver 1, two NRZ signals each having a signal speed of 25 Gbps are multiplexed into a 4-level pulse amplitude modulation (PAM) signal, that is, the PAM4 signal (multiplicity 2).

For example, inside a TOSA described below, a transmission speed is increased up to 50 Gbps per one wavelength by driving one semiconductor laser by the PAM4 signal. One TOSA is equipped with four semiconductor lasers, and generates four optical signals having different wavelengths.

Each semiconductor laser, for example, is driven by a direct modulation system, which directly changes an optical emission power by varying a driving current of a laser diode. Alternatively, the semiconductor laser may be configured to modulate CW light output from a laser diode using an optical modulator. Hereinbelow, a signal path between a plurality of electric signals input to and output from the optical transceiver 1 and an optical signal having one wavelength corresponding to the electric signals is referred to as a lane.

For example, one TOSA can cover four lanes and performs data transmission of 200 Gbps (50 Gbps×four wavelengths). One ROSA is provided with four lanes, each of which converts an optical signal to an electric signal (PAM4 signal), and, for example, performs data transmission of 200 Gbps in a manner similar to the TOSA. The CFP8 module is equipped with four OSAs (two TOSAs and two ROSAs, the OSA is the general name of the TOSA and the ROSA). One OSA brings a transmission speed of 200 Gbps. Accordingly, the CFP8 module covers eight lanes in total on each of the transmission side and the reception side and achieves a transmission capacity of 400 Gbps each for transmission and reception.

The optical transceiver 1 is provided with a housing 2. The housing 2 includes an upper housing 7 and a lower housing 8. The outer dimension of the housing 2 adheres to Multi-source Agreement (MSA) which is an industry standard. For example, the length of the housing 2 is 106 mm, the width of the housing 2 is 40 mm, and the height of the housing 2 is 9.5 mm. The housing 2 is provided with a receptacle 4 which receives an external optical connector. The external optical connector is, for example, an LC connector. The optical connector is used, for example, for each of transmission and reception. In this case, the receptacle 4 receives a pair of optical connectors.

Hereinbelow, directions of "front and back", "upper and lower", and "right and left" are used in the description with reference to the drawings. However, these are convenient terms based on an illustrated state. In the following description, the upper direction is a direction in which the upper housing 7 is disposed with respect to the lower housing 8. The front direction is a direction in which the receptacle 4 is disposed with respect to the housing 2. The right-left direction is a width direction of the housing 2 which is perpendicular to the upper-lower direction and the front-back direction.

The receptacle 4 is formed on the center in the right-left direction (width direction) of the housing 2. A pull tab (arm part) 5 extends forward from both right and left sides of the housing 2. The right and left parts of the pull tab (arm part) 5 extending forward are integrally coupled together in front of the receptacle 4. The optical transceiver 1 is provided with sliders 6 on both right and left sides of the housing 2. The slider 6 slides back and forth in conjunction with a movement in the front-back direction of the pull tab 5. The slider 6 includes a projection 6a on the back end thereof. When the housing 2 is inserted into a cage of a host system, the projection 6a is engaged with a tab which is formed on the cage of the host system. The engagement prevents the housing 2 from being unintentionally removed from the cage.

When the pull tab 5 is pulled forward and thereby the slider 6 slides to the front side, the projection 6a pushes and expands the tab outward, for releasing the engagement with the tab and the cage of the host system. Thus, the optical transceiver 1 can be detached from the cage by intentionally pulling the pull tab 5 forward. As described above, the height of the housing 2 is approximately 10 mm, which is slightly larger than the width of the slider 6 (the length in the upper-lower direction in FIG. 1). Accordingly, it is possible to increase an aggregation density of the optical transceiver 1 to the host system.

Figure 2:
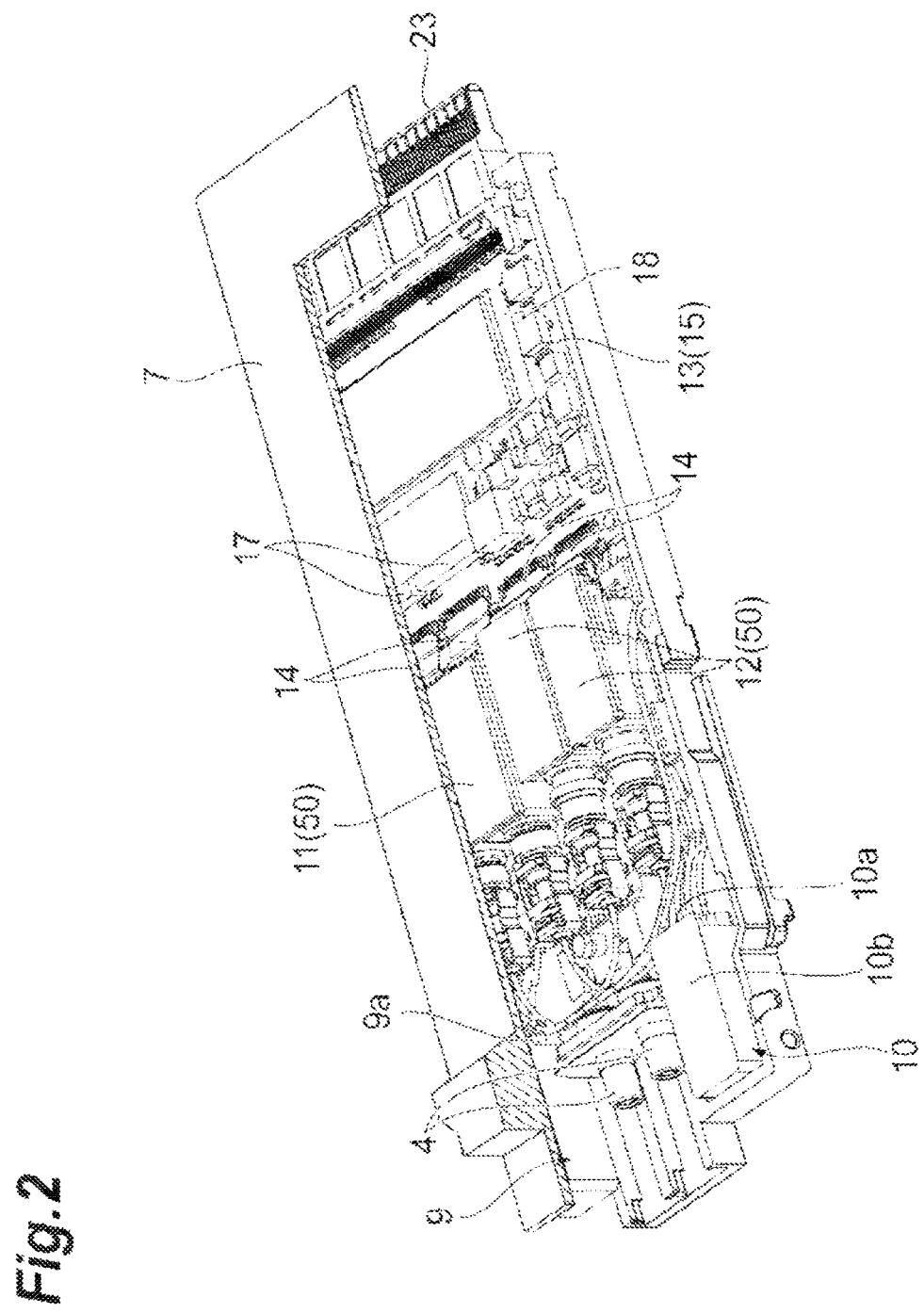
FIG. 2 is a perspective sectional view illustrating the internal structure of the optical transceiver of FIG. 1.
Figure 3:
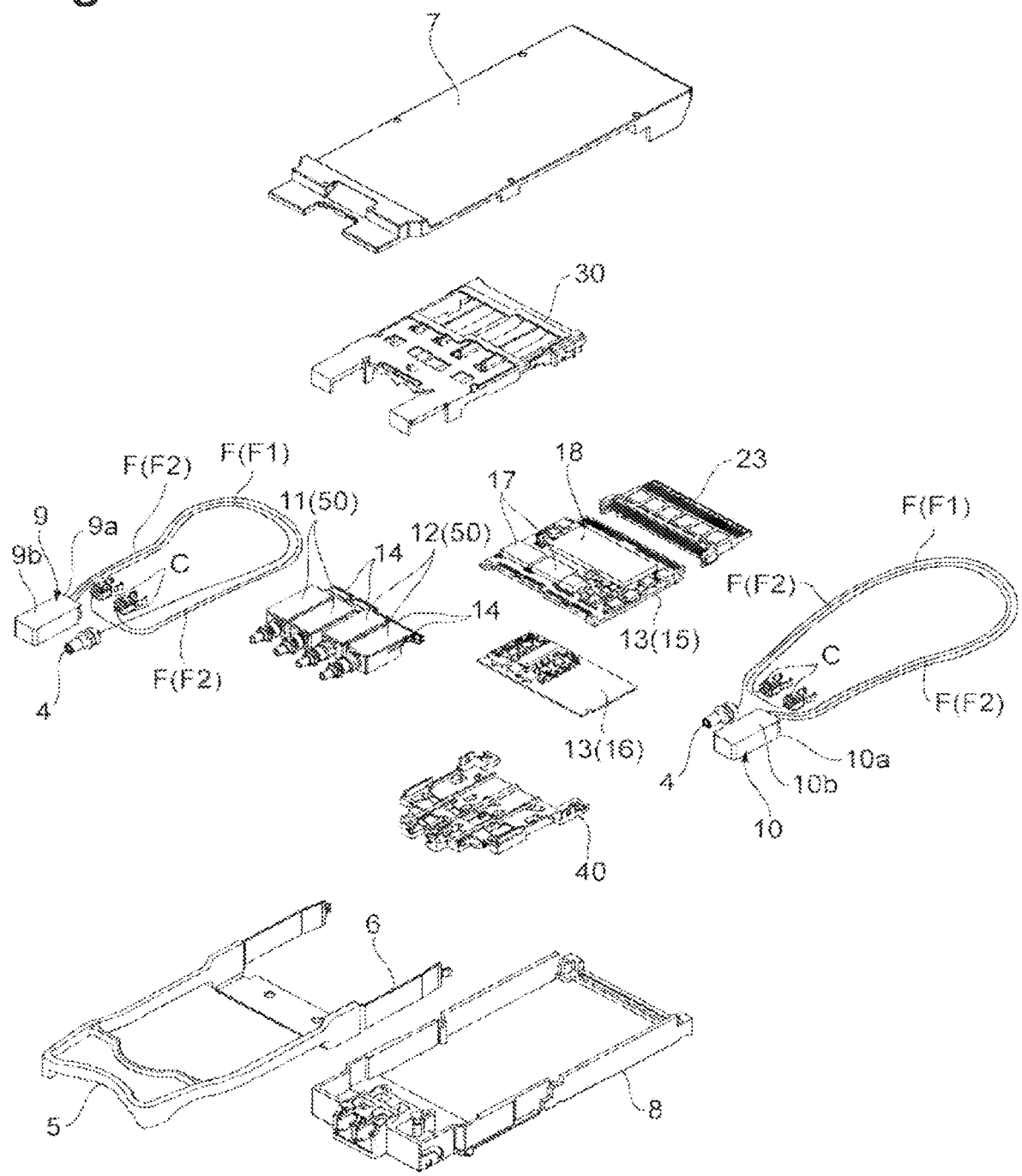
FIG. 3 is an exploded perspective view of the optical transceiver of FIG. 1.

FIG. 2 is a perspective sectional view illustrating the internal structure of the optical transceiver 1 with a part of the upper housing 7 cut away. FIG. 3 is an exploded perspective view of the optical transceiver 1. The upper housing 7 and the lower housing 8 house the receptacle 4 described above, an optical multiplexer (O-Mux) 9 and an optical demultiplexer (O-DeMux) 10 which are located on both right and left sides of the receptacle 4, a TOSA 11, an ROSA 12, a circuit board (printed circuit board) 13, and an FPC 14. In the present specification, the optical multiplexer 9 and the optical demultiplexer 10 may be collectively referred to as the optical multiplexer/demultiplexer.

As described above, the transmitter of the optical transceiver 1 is provided with eight lanes and handles eight optical signals having different wavelengths. Further, the receiver of the optical transceiver 1 is provided with eight lanes and handles eight optical signals having different wavelengths. The optical transceiver 1 receives a wavelength multiplexed optical signal through the receptacle 4. The wavelength multiplexed optical signal consists of the eight optical signals. The optical demultiplexer 10, for example, separates the wavelength multiplexed optical signal into two sub multiplexed optical signals. One of the two sub multiplexed optical signals consists of the optical signals for four lanes at the long wavelength side. Another of the two sub multiplexed optical signals consists of the optical signals for four lanes at the short wavelength side. The optical demultiplexer 10 is optically connected to two ROSAs 12 at the receiver. The optical multiplexer 9 multiplexes two sub multiplexed optical signals (each for four lanes) into one wavelength multiplexed optical signal (for eight lanes). The optical multiplexer 9 is optically connected to two TOSAs 11 at the transmitter. In the following description, the TOSA 11 and the ROSA 12 may be collectively referred to as optical subassemblies (OSAs) 50.

The receptacle 4 is optically connected to the OSA 50 through an internal fiber F and a simple connector C. FIG. 3 illustrates a state in which the simple connector C is separated from the OSA 50. One internal fiber F which extends from the receptacle 4 and two internal fibers which extend to the TOSAs 11 are optically connected to the optical multiplexer 9. Two internal fibers F which extend from the ROSAs 12 and one internal fiber F which extends to the receptacle 4 are optically connected to the optical demultiplexer 10. The "optically connected" means that an optical waveguide or an optical coupling system is constructed so that the wavelength multiplexed optical signal and the sub multiplexed optical signals described above are appropriately transmitted therethrough.

The two TOSAs 11 and the two ROSAs 12 are disposed on the back side of the optical multiplexer 9 and the optical demultiplexer 10. These OSAs 50 perform photoelectric conversion between an optical signal and an electric signal. Each of the two internal fibers F which extend from each of the optical multiplexer 9 and the optical demultiplexer 10 is optically connected to each OSA 50 through the simple connector C. Each internal fiber F is optically connected to an optical connection unit of each OSA 50. Optical components such as a lens and an isolator which constitute the optical coupling system are incorporated in the optical connection unit.

For example, the optical multiplexer 9 and the optical demultiplexer 10 have the same shape and the same outer dimension for external form. The optical multiplexer 9 and the optical demultiplexer 10 may include projecting parts 9a, 10a which project backward on bottoms 9b, 10b thereof, respectively. However, the projecting parts 9a, 10a may be omitted. Further, three internal fibers F are led out of each of the optical multiplexer 9 and the optical demultiplexer 10 in a pigtail manner. That is, the internal fiber F is directly and optically connected to an optical system inside each of the optical multiplexer 9 or the optical demultiplexer 10 and the receptacle 4. The internal fibers F lead out in a pigtail manner are integrally connected to the optical multiplexer 9 or the optical demultiplexer 10 and cannot be easily detached.

The internal fibers F include a first internal fiber F1 and a second internal fiber F2. Each of the optical multiplexer 9 and the optical demultiplexer 10 is optically connected to the receptacle 4 through the first internal fiber F1. Further, each of the optical multiplexer 9 and the optical demultiplexer 10 is connected to the simple connector C (OSA 50) through the second internal fiber F2. In the following description, when it is necessary to distinguish the first internal fiber F1 and the second internal fiber F2 from each other, the internal fibers F are referred to as the first internal fiber F1 and the second internal fiber F2. On the other hand, when it is not necessary to distinguish the first internal fiber F1 and the second internal fiber F2 from each other, the first internal fiber F1 and the second internal fiber F2 are collectively referred to as the internal fibers F.

Each OSA 50 is attached to the circuit board (printed circuit board) 13 through a first holding member 30 and a second holding member 40 (described below). The first holding member 30 and the second holding member 40 allow electric connection between the FPC 14 the circuit board 13 to be protected (reinforced) from a stress. Thus, it is possible to improve the reliability of the electric connection. The circuit board 13 is equipped with a circuit which is electrically connected to the OSA 50 through the FPC 14. The circuit board 13 is disposed on the back side of the OSA 50. The FPC 14 is disposed on the back side of the OSA 50 and the front side of the circuit board 13.

The circuit board 13 includes a first circuit board 15 which is located on the upper side and a second circuit board 16 which is located on the lower side. On the first circuit board 15, two LD drivers 17 which face the back side of the two TOSAs 11, a digital signal processor (DSP) 18, and a preamplifier IC are mounted. The preamplifier IC may be incorporated in the ROSA 12. The DSP 18 is mounted, for example, on the center of the first circuit board 15 or the back side of the LD drivers. The DSP 18 is a signal processing IC, and executes signal processing with respect to eight electric signals on the transmission side and eight electric signal on the reception side. The DSP 18 converts, for example, two NRZ signals of 25 Gbps into a PAM4 signal of 50 Gbps with a symbol rate of 50 Gbaud.

The second circuit board 16 is, for example, electrically connected to the first circuit board 15, which is located on the upper side of the second circuit board 16, through a stack connector. Space-saving electric connection can be achieved as compared to the FPC by using the stack connector (also called a stacking connector). For example, a male connector of the stack connector is mounted on one of the circuit boards, and a female connector of the stack connector is mounted on the other circuit board. The first circuit board 15 and the second circuit board 16 are firmly fixed to each other by engagement between the male connector and the female connector. Further, the stack connector is also applicable to relatively high speed transmission of an electric signal. The first circuit board 15 is equipped with circuit components, for example, on both faces thereof (double-sided mounting). The second circuit board 16 is equipped with circuit components, for example, only on the upper face thereof (single-sided mounting).

The optical transceiver 1 includes a plug board 23, which is different from the circuit board 13, on the back side of the circuit board 13. The plug board 23 is engaged with an electric connector which is disposed inside the cage of the host system. For example, 100 or more electrodes are densely disposed on each of the electric connector and the plug board 23. The electrodes of the electric connector and the electrodes of the plug board 23 are electrically connected to each other by the above engagement. In order to correctly connect the corresponding electrodes, the relative position between the electric connector and the plug board 23 is accurately determined.

In order to ensure the accuracy of the relative position between the electric connector and the plug board 23, it is necessary to increase the engagement force between the electric connector and the plug board 23, and an insertion and removal force of the optical transceiver 1 with respect to the electric connector is large. The plug board 23 is separated from the circuit board 13 so that the plug board 23 and the circuit board 13 are provided as separate boards to prevent a stress acting on the plug board 23 during the insertion and removal of the optical transceiver 1 from spreading to the circuit board 13 and firmly engage the plug board 23 with the electric connector.

Figure 4:
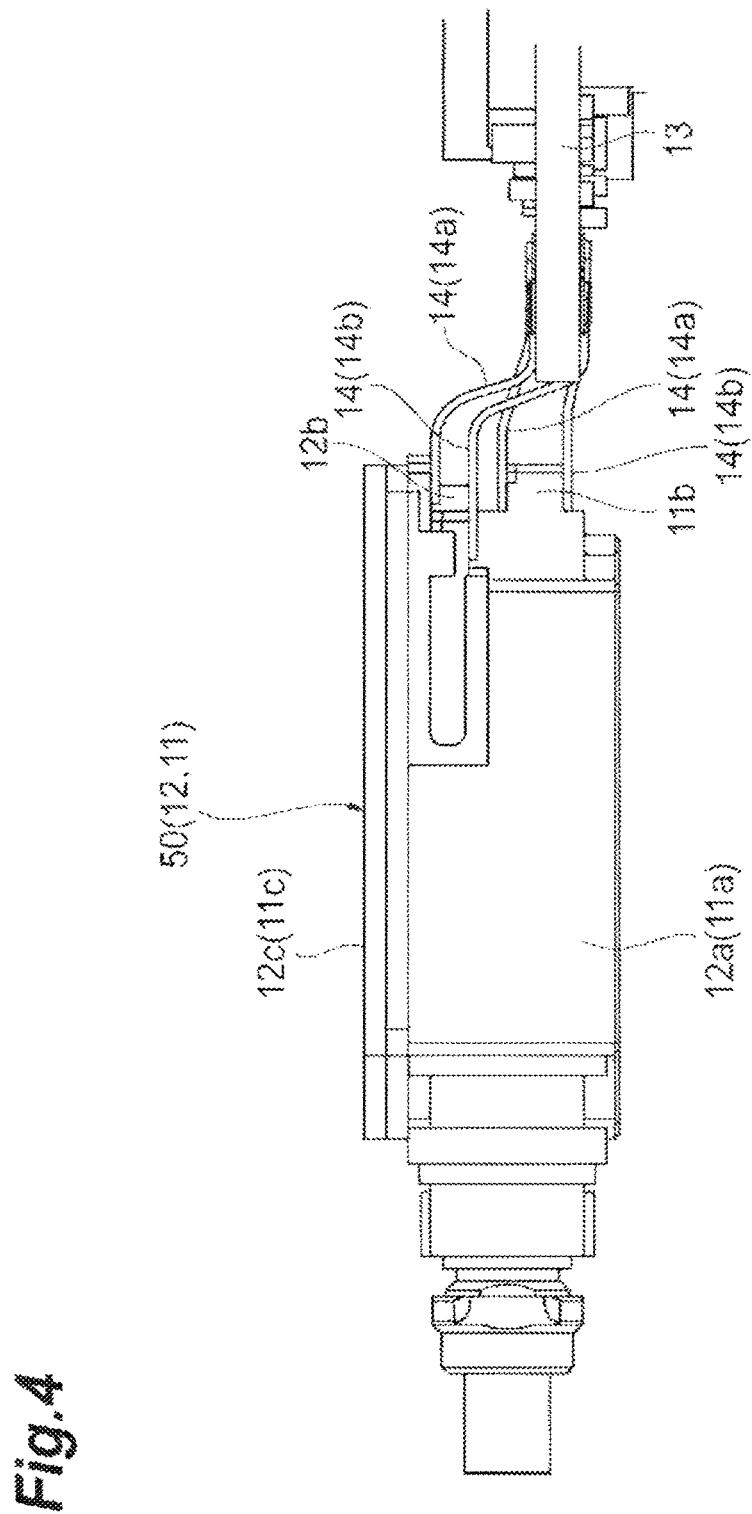
FIG. 4 is a side view of an OSA, an FPC, and a circuit board.

As illustrated in FIG. 4, the OSAs 50 include packages 11a, 12a each having a rectangular parallelepiped shape and terminals 11b, 12b which are led out only from the back side of the packages 11a, 12a. The packages 11a, 12a are provided with the terminals 11b, 12b on the side opposite to the receptacle 4 in the longitudinal direction of the optical transceiver 1. Bottom faces 11c, 12c of the packages 11a, 12a abut on the inner face of the upper housing 7. That is, when the side on which the bottom faces 11c, 12c are located is defined as the lower side, each OSA 50 is mounted upside down inside the upper housing 7.

Figure 5:
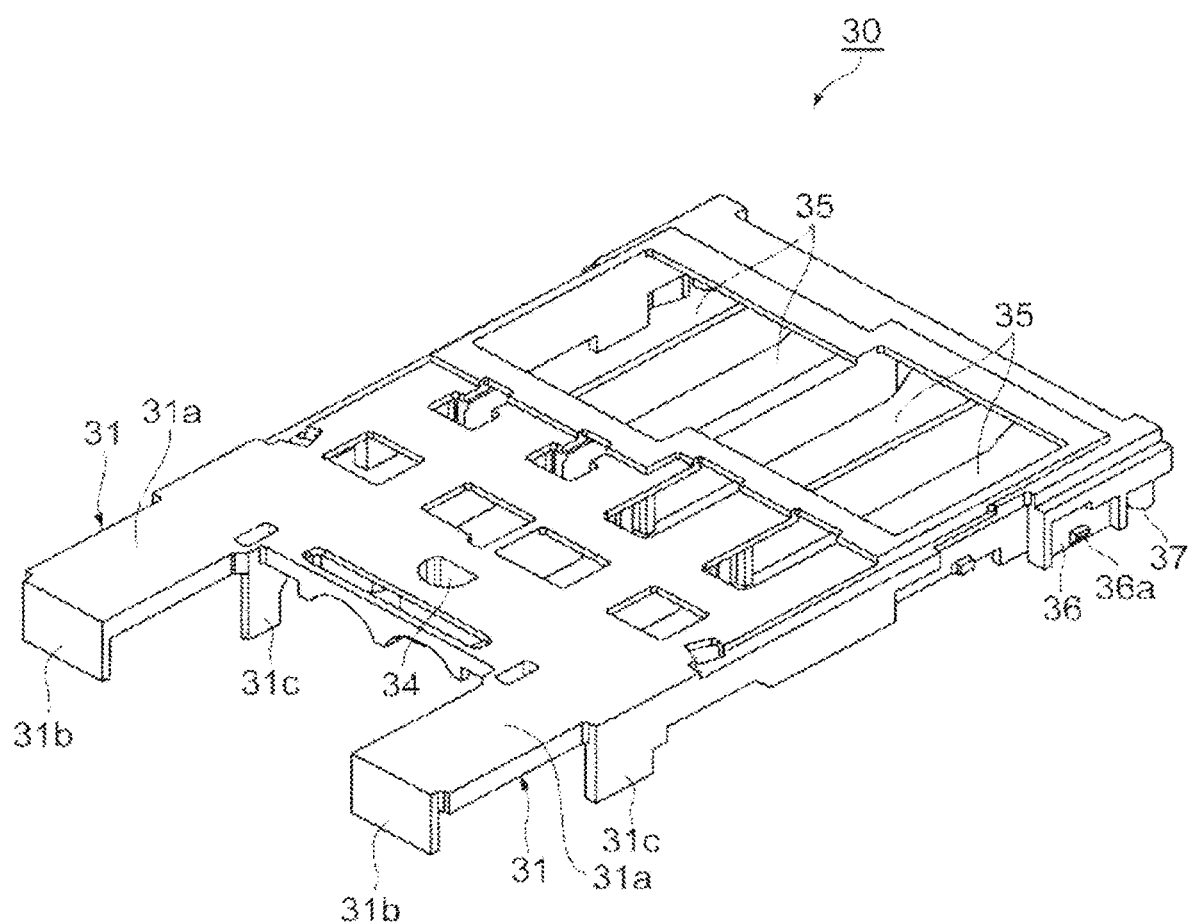
FIG. 5 is a perspective view of a first holding member of the optical transceiver of FIG. 1.
Figure 6:
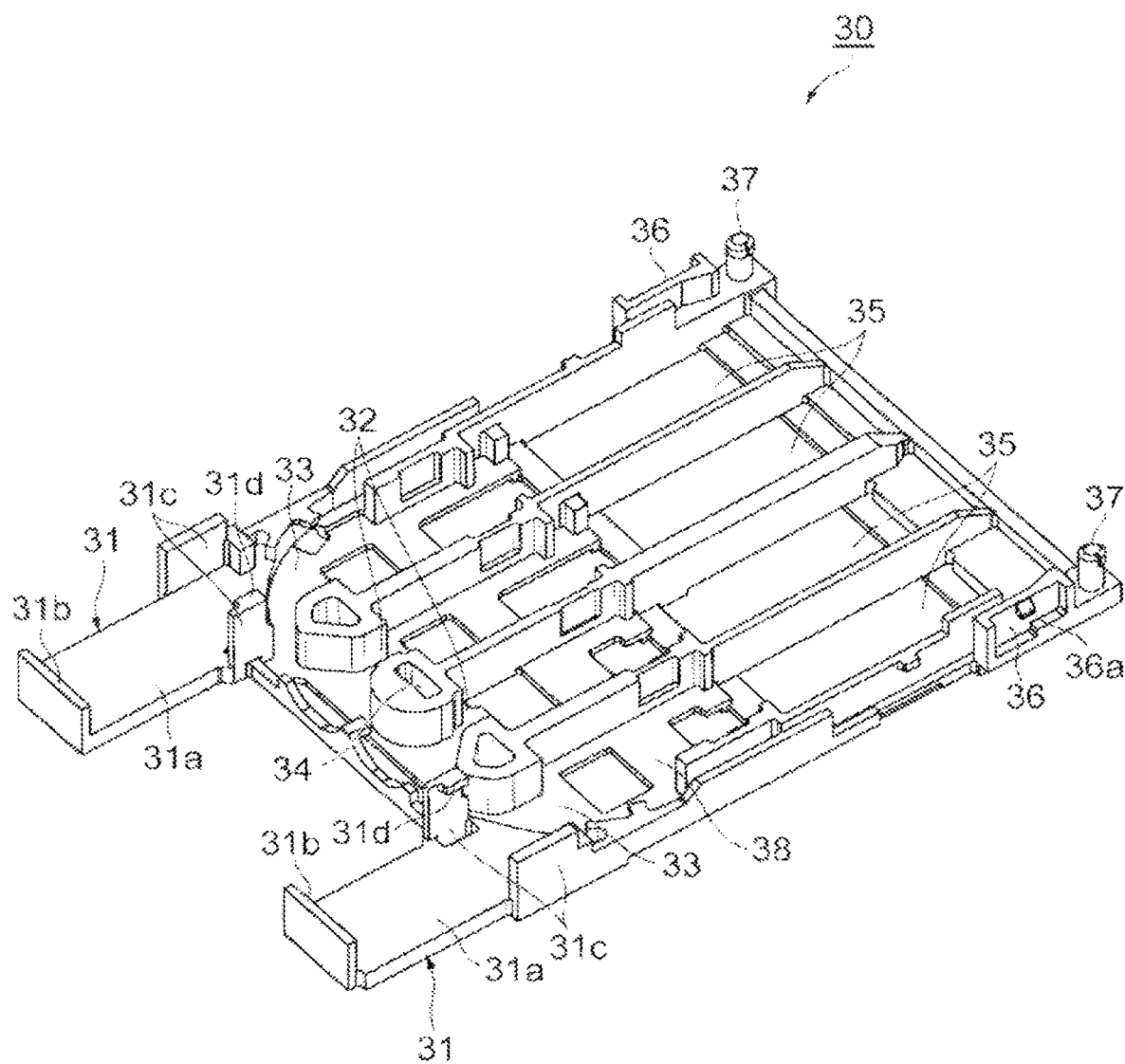
FIG. 6 is a perspective view of the first holding member of FIG. 5 viewed from the opposite side of the FIG. 5.

FIGS. 5 and 6 are perspective views of the first holding member 30. The first holding member 30 has a rectangular plate-like appearance. The first holding member 30 is provided with projecting parts 31, grooves (guides) 32, 33, holes 34, 35, engagement parts 36, and projections 37. The projecting parts 31 are disposed on both right and left ends of the first holding member 30. The projecting parts 31 temporarily fix the optical multiplexer 9 and the optical demultiplexer 10 to the first holding member 30. The temporal fixation means that, for example, the optical multiplexer/demultiplexer is not detached even when the first holding member is obliquely tilted, but the optical multiplexer/demultiplexer is fixed with a strength with which the optical multiplexer/demultiplexer can be detached with a hand without using a tool in the temporarily fixed state. Each of the projecting parts 31 includes a projecting piece 31a which projects forward, a bent part 31b which is bent at the tip in the longitudinal direction of the projecting piece 31a, and a pair of walls 31c which stands along the width direction of the projecting piece 31a on the base end in the longitudinal direction of the projecting piece 31a. A projecting part 31d which projects inward in the width direction of the projecting piece 31a is formed on the upper end of one of the two walls 31c.

When the optical transceiver 1 is assembled, fixing each of the optical multiplexer 9 and the optical demultiplexer 10 on the projecting part 31 enables efficient assembly. Specifically, the optical multiplexer 9 or the optical demultiplexer 10 is placed on the projecting piece 31a of the projecting part 31, sandwiched between the bent part 31b and the pair of walls 31c, and held by the projecting part 31d. Accordingly, the optical multiplexer 9 and the optical demultiplexer 10 are temporarily fixed to the projecting parts 31. The configuration of the optical multiplexer 9 and the optical demultiplexer 10 will be described in detail below. The optical multiplexer 9, the optical demultiplexer 10, and the OSAs 50 are integrally and temporarily held on the first holding member 30, so that an intermediate assembly M (described below, referred to FIG. 18 and the like) is assembled. The assembly of the intermediate assembly M improves the efficiency of the assembly of the optical transceiver 1.

The grooves 32, 33 are formed on an inner face 38 of the first holding member 30. The grooves 32, 33 are guides for disposing the internal fibers F. The grooves 32, 33 guides the internal fiber F so that the internal fiber F passes through a predetermined path. The groove 32 is formed on the inner side in the right-left direction of the first holding member 30. The groove 33 is formed on the outer side in the right-left direction of the first holding member 30. The internal fiber F which is led out of each of the optical multiplexer 9 and the optical demultiplexer 10 and turned (bent and folded) on the back part, and then extends up to the simple connector C is housed in each of the grooves 32, 33.

The hole 34 is a hole for engaging the first holding member 30 with the second holding member 40. The holes 35 expose the bottom faces 11c, 12c of the OSAs 50 from the first holding member 30. The engagement parts 36 are disposed on the back parts of right and left side walls of the first holding member 30. The projections 37 are parts for engaging the first holding member 30 with the circuit board 13 and disposed on the right and left ends of the first holding member 30 near the back end thereof.

For example, a thermo electric cooler (TEC) is a component that is mounted inside the OSA 50 and requires heat dissipation. The bottom face of the TEC requires a heat dissipation mechanism for releasing absorbed heat when cooling a semiconductor element (e.g., a semiconductor laser) producing heat (Joule heat) by the Peltier effect. Thus, it is possible to improve the heat dissipation performance of the OSAs 50 by bringing the bottom faces 11c, 12c of the OSAs 50 on which the bottom faces of the TECs are located into surface contact with the inner face of the upper housing 7 by allowing the bottom faces 11c, 12c to pass through the holes 35.

The area of the bottom face 11c of the OSA 50 may be larger than the area of each hole 35. In this case, the OSA 50 is prevented from coming out of the hole 35. However, in this state, a gap is formed between the bottom faces 11c, 12c and the inner face of the upper housing 7, which may reduce the heat dissipation performance (thermal conductivity). Thus, the gap is filled with a gel heat dissipation member having a thickness equal to or larger than the thickness (depth) of the hole 35 of the first holding member 30. Accordingly, the OSA 50 is brought into surface contact with the inner face of the upper housing 7 through the heat dissipation member. Thus, a heat dissipation path having high thermal conductivity from the OSA 50 to the upper housing 7 is constructed.

Figure 7:
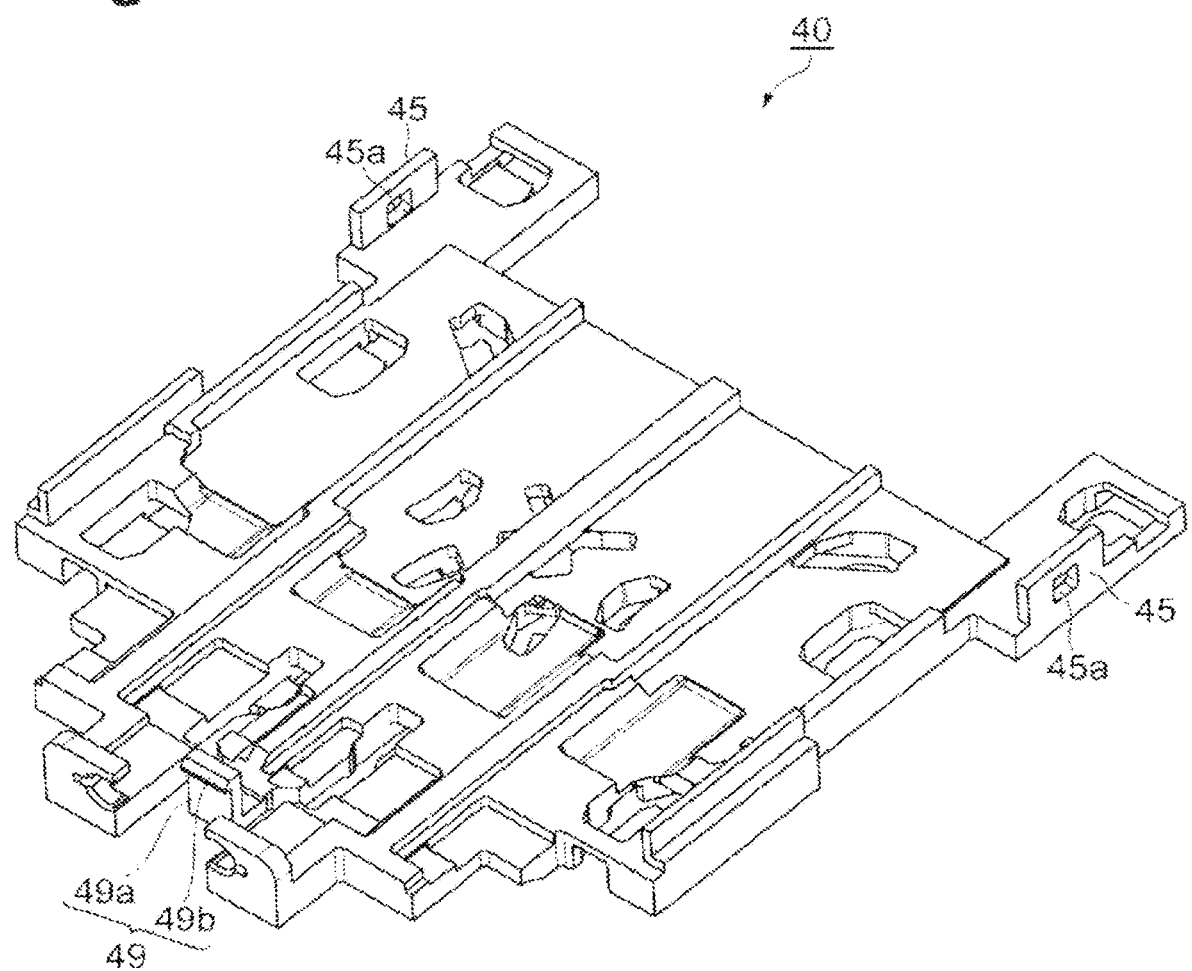
FIG. 7 is a perspective view of a second holding member of the optical transceiver of FIG. 1.
Figure 8:
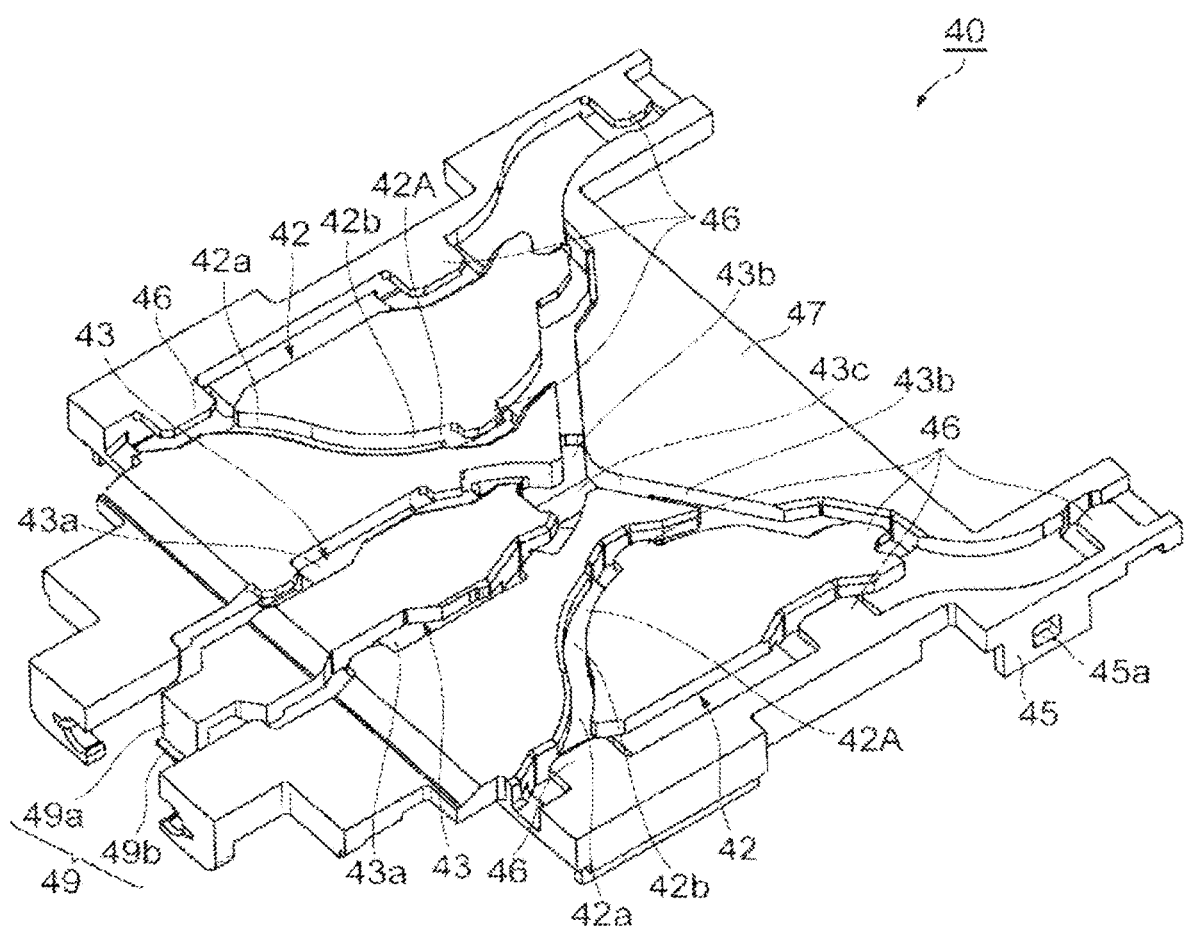
FIG. 8 is a perspective view of the second holding member of FIG. 7 viewed from the opposite side of the FIG. 7.

FIGS. 7 and 8 are perspective views of the second holding member 40. The second holding member 40 has a substantially rectangular plate-like appearance. The second holding member 40 is provided with grooves (guides) 42, 43 in which the internal fibers F are housed, projecting parts 45, retainers 46, and a projection 49. The projecting parts 45 are engaged with the respective engagement parts 36 of the first holding member 30. The projection 49 is engaged with the hole 34 of the first holding member 30. Thus, the second holding member 40 is engaged with the first holding member 30 at three positions, namely the projection 49 and the pair of projecting parts 45.

Each of the projecting part 45 includes a hole 45a, and a projection 36a is formed on each of the engagement parts 36. The first holding member 30 and the second holding member 40 are firmly engaged with each other at two positions on the back side by fitting the projections 36a with the holes 45a. The projection 49 includes a first projecting part 49a which projects in an out-of-plane direction of the second holding member 40 (when the appearance of the second holding member 40 is regarded as a plate-like shape, the direction perpendicular to the plate) and a second projecting part 49b which projects forward at the end of the first projecting part 49a. The second projecting part 49b prevents the projection 49 from coming out of the hole 34. Thus, the first holding member 30 and the second holding member 40 are firmly engaged with each other at one position on the front side by the engagement between the projection 49 and the hole 34.

The second holding member 40 is assembled to the first holding member 30 with the OSAs 50 sandwiched between the second holding member 40 and the first holding member 30. In the above, although the area of the bottom face 11c of the OSA 50 may be larger than the area of each hole 35, the area of the bottom face 11c of the OSA 50 may be smaller than the area of each hole 35. When the second holding member 40 is assembled to the first holding member 30, the overall height of the first holding member 30 and the second holding member 40 is set, for example, slightly lower than the overall height of the OSAs 50. In this case, the bottom faces 11c, 12c of the OSAs 50 reliably project toward the upper housing 7 from the holes 35 of the first holding member 30. Thus, when the overall height of the first holding member 30 and the second holding member 40 is slightly lower than the overall height of the OSAs 50, the OSAs 50 reliably come into contact with the inner face of the upper housing 7. Thus, the heat dissipation path having high thermal conductivity from the bottom faces 11c, 12c of the OSAs 50 to the upper housing 7 can be reliably formed.

The grooves 42, 43 are guides that guide the internal fibers F. The grooves (guides) 42, 43 are formed on a bottom face 47 of the second holding member 40. A pair of grooves 42 (first guide) is formed on the outer side in the right-left direction of the second holding member 40. A pair of grooves 43 is formed on the inner side in the right-left direction of the second holding member 40. Each groove 43 faces the receptacle 4 and houses the first internal fiber F1 extending from the receptacle 4.

The grooves 42 face the back side of the optical multiplexer 9 and the optical demultiplexer 10. The grooves 42 guide one first internal fiber F1 and two second internal fibers F2 which extend toward each of the optical multiplexer 9 and the optical demultiplexer 10. Each groove 42 extends straight from the front side toward the back side of the second holding member 40 and includes a bypass 42A (second guide) which branches off halfway. The bypass 42A branches from the groove 42, which extends straight, to the inner side in the right-left direction (the inner side in the width direction of the optical transceiver 1) toward a center line in the lateral direction of the optical transceiver 1, extends backward while curving, and merges with the straight part of the groove 42.

Some of the internal fibers F pass through the bypass 42A, and the rest of the internal fibers F is disposed along the straight part of the groove 42 without passing through the bypass 42A. Thus, either the straight part (first guide) of the groove 42 or the bypass 42A (second guide) is selectable as a path of the internal fiber F. The radius of curvature of the bypass 42A is equal to or larger than the minimum bend radius of the internal fiber F. The bypass 42A includes, for example, a first curve 42a which has a circular arc shape and has a rotation center on the inner side in the right-left direction of the second holding member 40 and a second curve 42b which has a circular arc shape and has a rotation center on the outer side in the right-left direction of the second holding member 40. The length of a path when the internal fiber F is housed by passing through the bypass 42A of the groove 42 is longer than the length of a path when the internal fiber F is housed by passing through the straight part of the groove 42. In other words, the second holding member 40 provides a path (first guide) having a first length when guiding the internal fiber F through the straight part of the groove 42 and another path (second guide) having a second length when guiding the internal fiber F through the bypass 42A. The second length is set to be longer than the first length for detouring.

Since the bypass 42A includes the first curve 42a and the second curve 42b in this manner, the internal fiber F can be disposed in a gently bent state in the bypass 42A. Further, selecting either the straight part of the groove 42 or the bypass 42A allows the length of a part of the internal fiber F, the part being housed in the groove 42 to be adjusted. In the present embodiment, one of the two second internal fibers F2 relating to either the optical multiplexer 9 or the optical demultiplexer 10 is passed through the bypass 42A. On the other hand, the other second internal fiber F2 and the first internal fiber F1 extend straight in the straight part of the groove 42 without passing through the bypass 42A.

The groove 43 includes a first part 43a which extends straight backward from the receptacle 4 and a second part 43b which obliquely extends backward and toward the end in the right-left direction of the second holding member 40 from the back end of the first part 43a. The second parts 43b of the two grooves 43 form an intersection 43c intersecting on the center of the second holding member 40 and obliquely extend toward the respective ends in the right-left direction from the intersection 43c. Each second part 43b obliquely extending backward from the intersection 43c merges with the groove 42 halfway.

Each of the grooves 42, 43 is provided with retainers 46. The retainers 46 prevent the internal fibers F housed in the grooves 42, 43 from coming out of the grooves 42, 43. In each of the grooves 42, 43, each retainer 46 projects to the inner side of the groove 42, 43 from the inner wall of the groove 42, 43 so as to close the groove 42, 43. The retainers 46 are disposed, for example, on each of the front side of the bypass 42A, the top of the bypass 42A extending in a curved shape, the straight part of the groove 42, and the back side of the second part 43b of the groove 43. The projecting length of the retainer 46 to the inner side of each groove 42, 43 is set so that the distance between the tip of the retainer 46 and an inner wall facing the projecting inner wall of the retainer 46 (or the inner wall of the groove 42, 43 facing the tip of the retainer 46) is larger than the outer diameter of the internal fiber F. Accordingly, it is possible to house the internal fibers F in the grooves 42, 43 without being interrupted by the retainers 46 and effectively prevent the housed internal fibers F from coming out of the grooves 42, 43.

Figure 9:
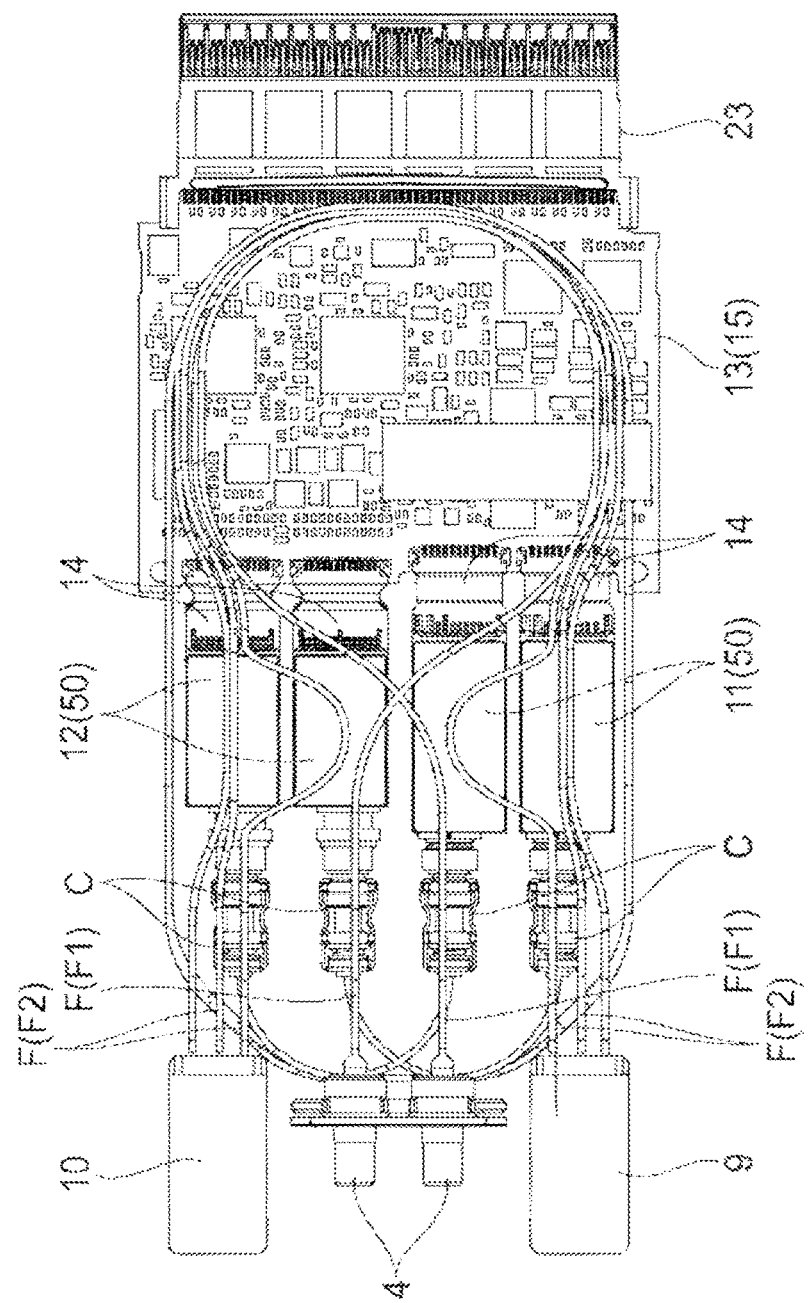
FIG. 9 is a plan view of components of the optical transceiver of FIG. 1.

FIG. 9 is a diagram for describing routing (path) of the internal fibers F. FIG. 9 omits the illustration of the first holding member 30 and the second holding member 40. The first internal fibers F1 led out of the receptacle 4 extend straight backward, curve to opposite sides in the right-left direction on the OSAs 50 (the outer face of the second holding member 40), curve to the other side along the inner side of the outer edge of the circuit board 13 on the circuit board 13 while maintaining the curvature equal to or larger than the minimum bend radius, pass on the OSAs 50 located on the outer side in the right-left direction, and are optically connected to the optical multiplexer 9 and the optical demultiplexer 10.

The two second internal fibers F2 led out of each of the optical multiplexer 9 and the optical demultiplexer 10 extend backward while being guided by the groove 42. One of the two second internal fibers F2 passes through the bypass 42A and curves toward the center line to the inner side in the width direction of the optical transceiver 1. The other second internal fiber F2 passes through the straight part backward without passing through the bypass 42A. The two second internal fibers F2 extending backward from the second holding member 40 largely curve to the opposite side in the right-left direction along the inner side of the outer edge of the circuit board 13 on the circuit board 13, and are led out to the front side along the wall of the engagement part 36 on the back end of the first holding member 30. The two second internal fibers F2 are bent on the outer side of the outermost wall of the groove 33 of the first holding member 30 and extend backward. Then, the two second internal fibers F2 are guided by the grooves 32, 33 and connected to the simple connectors C. Since the second internal fiber F2 is curved along the outermost wall of the groove 33, it is possible to reduce the curvature of bending of the second internal fiber F2. The curvature of the second internal fiber F2 is, for example, smaller than 20 mm.

Figure 10:
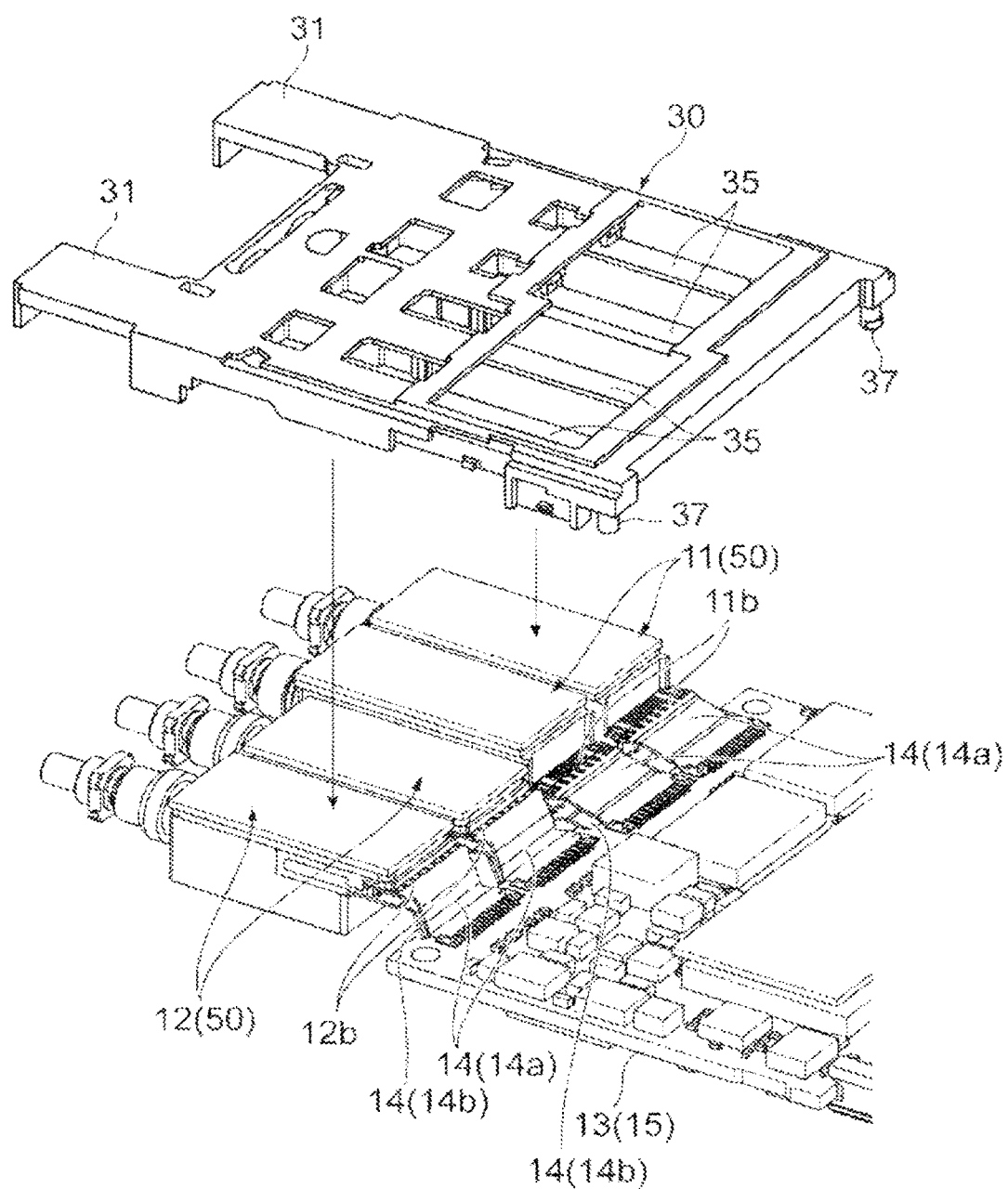
FIG. 10 is a perspective view of the OSAs, the circuit board, and the first holding member.

Next, connection between the OSA 50 and the circuit board 13 by the FPC 14 will be described. FIG. 10 illustrates a state in which the OSAs 50 and the circuit board 13 are first assembled together, and the first holding member 30 is then assembled to the circuit board (printed circuit board) 13. As illustrated in FIGS. 4 and 10, the FPC 14 includes a first FPC 14a which connects the front faces (the upper faces in FIG. 4) of the terminals 11b, 12b to the front face of the circuit board 13 and a second FPC 14b which connects the back faces (the lower faces in FIG. 4) of the terminals 11b, 12b to the back face of the circuit board 13. A position in the upper-lower direction where the terminal 11b is led out of the TOSA 11 differs from a position in the upper-lower direction where the terminal 12b is led out of the ROSA 12. Thus, either the FPC 14 connected to the TOSA 11 or the FPC 14 connected to the ROSA 12 is formed with a stress larger than a stress applied to the other one due to a height difference in the upper-lower direction from the circuit board 13. For example, a larger height may cause a smaller curvature of bending.

In the example of FIG. 10, the height difference between the front face of the terminal 12b of the ROSA 12 and the front face of the circuit board 13 is larger than the height difference between the front face of the terminal 11b of the TOSA 11 and the front face of the circuit board 13. In this case, a large stress is applied to the FPC 14 connected to the ROSA 12. This occurs because the terminal 11b and the terminal 12b are located at substantially the same position in the front-back direction. That is, a bending degree (curvature) red of the FPC 14 depends on the position in the front-back direction of the terminals 11*b*, 12*b* (or the distance from the circuit board 13) and the height difference in the upper-lower direction between the terminals 11*b*, 12*b* and the circuit board 13. When various assembly operations of the optical transceiver 1 are performed in this state, it is assumed that a large moment of force is particularly applied to the FPC 14 connected to the ROSA 12. Thus, in the optical transceiver 1, the OSA 50 is temporarily mounted on the first holding member 30 during assembly to relax the stress applied to the FPC 14 (the moment caused by the weight of the TOSA 11, the ROSA 12).

Figure 11A:
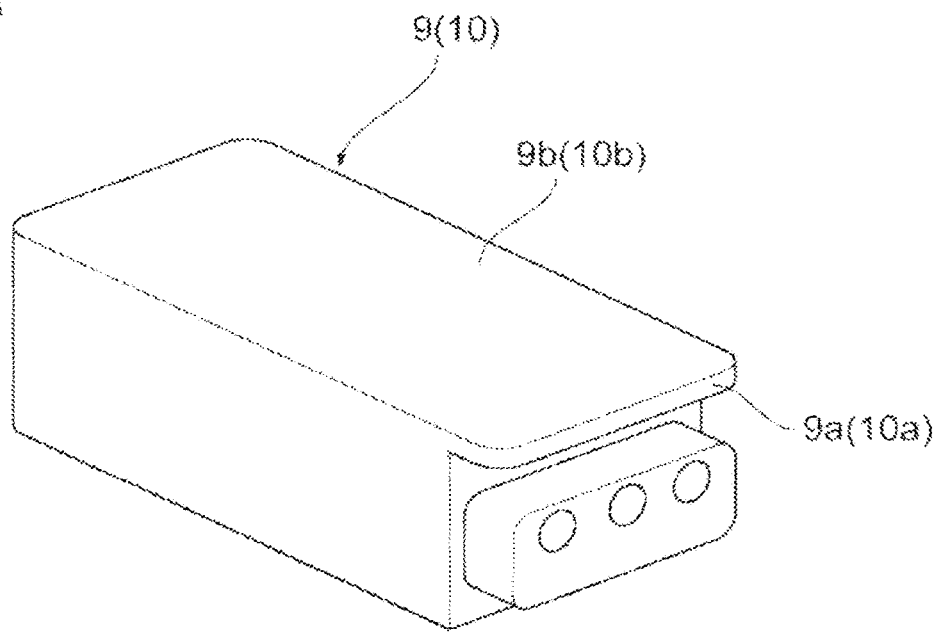
FIG. 11A is a perspective view of an optical multiplexer (optical demultiplexer).
Figure 11B:
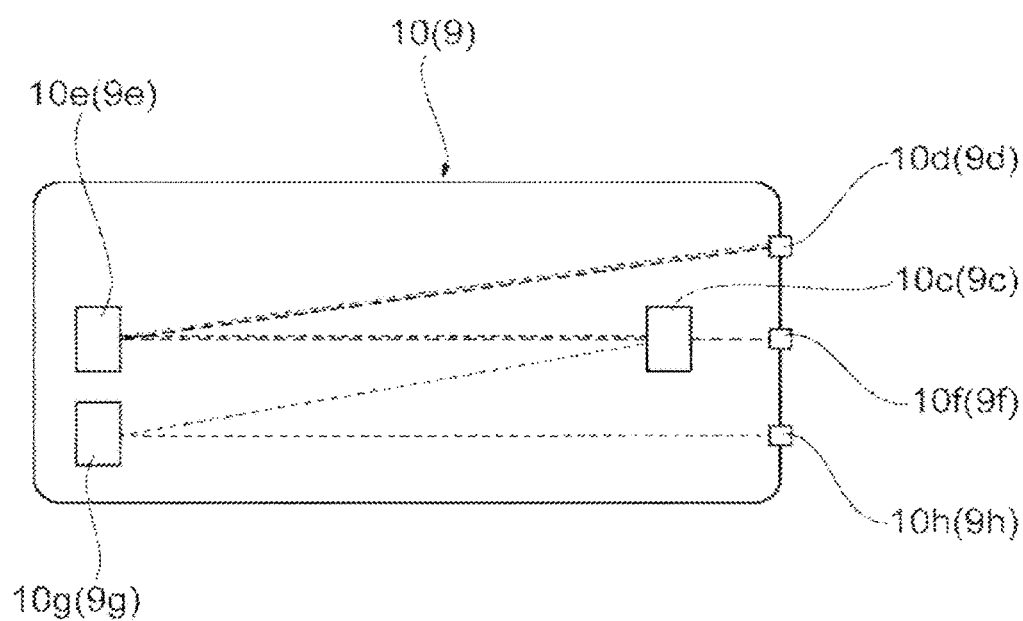
FIG. 11B is a diagram schematically illustrating the internal structure of the optical demultiplexer (optical multiplexer).

FIG. 11A is a perspective view illustrating the appearance of the optical multiplexer 9. FIG. 11B is a diagram for describing the function of the optical demultiplexer 10. The appearance of the optical demultiplexer 10 is similar to the appearance of the optical multiplexer 9. Thus, description for the appearance of the optical demultiplexer 10 will be appropriately omitted. The optical multiplexer 9 is mounted inside the optical transceiver 1 with the bottom 9*b* up. The bottom 9*b* of the optical multiplexer 9 is temporarily fixed to the projecting part 31 of the first holding member 30, and the circuit board 13, the OSAs 50, the first holding member 30, and the second holding member 40 are assembled.

As illustrated in FIG. 11B, the optical demultiplexer 10 includes a wavelength selection filter 10*c*. The optical transceiver 1 handles optical signals having eight kinds of wavelengths (peak wavelengths), for example, which are set at intervals of 4 nm to 5 nm in the range of 1274 nm to 1310 nm. The wavelength selection filter 10*c* separates a wavelength multiplexed optical signal in which the optical signals having the eight kinds of wavelengths are multiplexed into optical signals (sub multiplexed optical signal) for four lanes (1310 nm, 1305 nm, 1300 nm, 1295 nm) at the long wavelength side and optical signals (sub multiplexed optical signal) for four lanes (1274 nm, 1278 nm, 1282 nm, 1286 nm) at the short wavelength side.

The wavelength selection filter 10*c* has a cutoff wavelength, for example, between 1286 nm and 1295 nm (e.g., 1290 nm). The wavelength selection filter 10*c* is obtained by forming a dielectric multilayer film on a substantially transparent base material with respect to the cutoff wavelength. A wavelength selection function of the wavelength selection filter 10*c* depends on an incidence angle of light, that is, the angle formed between a normal line of the wavelength selection filter 10*c* and an optical axis of incident light (signal light). When the incidence angle of light is 0°, the best wavelength selection function is obtained. As the incidence angle of light increases, the wavelength selection function is reduced. The reduction in the wavelength selection function means that, for example, the difference between a limit value of a transmission wavelength and a limit value of a reflection wavelength near the cutoff wavelength increases, which deteriorates the filter characteristics.

In the optical demultiplexer 10, the wavelength 8-multiplexed light having the above wavelengths enters the optical demultiplexer 10 through a port 10*d*, and enters the wavelength selection filter 10*c* after being totally reflected by a mirror 10*e*. In the wavelength 8-multiplexed light (wavelength multiplexed optical signal), light (sub multiplexed optical signal) for four lanes at the long wavelength side (or four lanes at the short wavelength side) passes through the wavelength selection filter 10*c* and is output from a port 10*f*, and light (sub multiplexed optical signal) for four lanes at the short wavelength side (or four lanes at the long wavelength side) is reflected by the wavelength selection filter 10*c*. The four optical signals (sub multiplexed optical signal) reflected by the wavelength selection filter 10*c* are totally reflected by a mirror 10*g* and output from a port 10*h*. Each of the ports 10*d*, 10*f*, 10*h* is provided with a collimate lens (not illustrated). A collimate optical system is employed inside the optical demultiplexer 10. That is, an optical signal is reflected or transmitted as described above in a collimate light state.

The optical demultiplexer 10 has been described above. In the optical multiplexer 9, input and output are opposite to those in the optical demultiplexer 10. That is, optical signals (sub multiplexed optical signal) for four lanes at the long wavelength side (or four lanes at the short wavelength side) enter the optical multiplexer 9 through a port 9*h*. Then, the optical signals are totally reflected by a mirror 9*g* and then reflected by a wavelength selection filter 9*c* again. On the other hand, optical signals (sub multiplexed optical signal) for four lanes at the short wavelength side (or four lanes at the long wavelength side) enter the optical multiplexer 9 through a port 9*f* and pass through the wavelength selection filter 9*c*. The signal light for four lanes reflected by the wavelength selection filter 9*c* and the signal light for four lanes transmitted through the wavelength selection filter 9*c* are totally reflected by a mirror 9*e* and then output as a wavelength multiplexed optical signal through a port 9*d*. Accordingly, optical components mounted inside the optical multiplexer 9 can be similar to the optical components mounted inside the optical demultiplexer 10.

FIG. 12 is a perspective view of the optical multiplexer 9 (optical demultiplexer 10), the receptacle 4, the simple connectors C, and the internal fibers F. The connection between the optical multiplexer 9 and the internal fiber F and the connection between the receptacle 4 and the internal fiber F are so called pigtail connection (integrated connection). That is, the internal fiber F is directly and optically connected to the optical system inside each of the optical multiplexer 9 and the receptacle 4. The simple connector C is attached to the OSA 50. The OSA 50 and the internal fiber F are connected through the simple connector C. The simple connector C includes hooks C1 on both sides thereof. The simple connector C is connected to the OSA 50 through the hooks C1.

The optical multiplexer 9 (optical demultiplexer 10) and the receptacle 4 are so-called optically passive components. Thus, there are relatively small variations in performances of the respective components. On the other hand, the OSA 50 is equipped with a semiconductor optical element (active component) such as an LD or a PD inside thereof. Thus, there are relatively large variations in performances of the respective components. Thus, it is preferred that the OSA 50 can be replaced as compared to the passive components. Thus, each OSA 50 can be independently replaced when a characteristic failure occurs by connecting the OSA 50 using the simple connector C which is easily attached and detached. Replacing only the OSA 50 having a characteristic failure makes it possible to reduce a loss on manufacture as compared to, for example, discarding the entire optical transceiver 1 with high added value after the completion of assembly.

Figure 13:
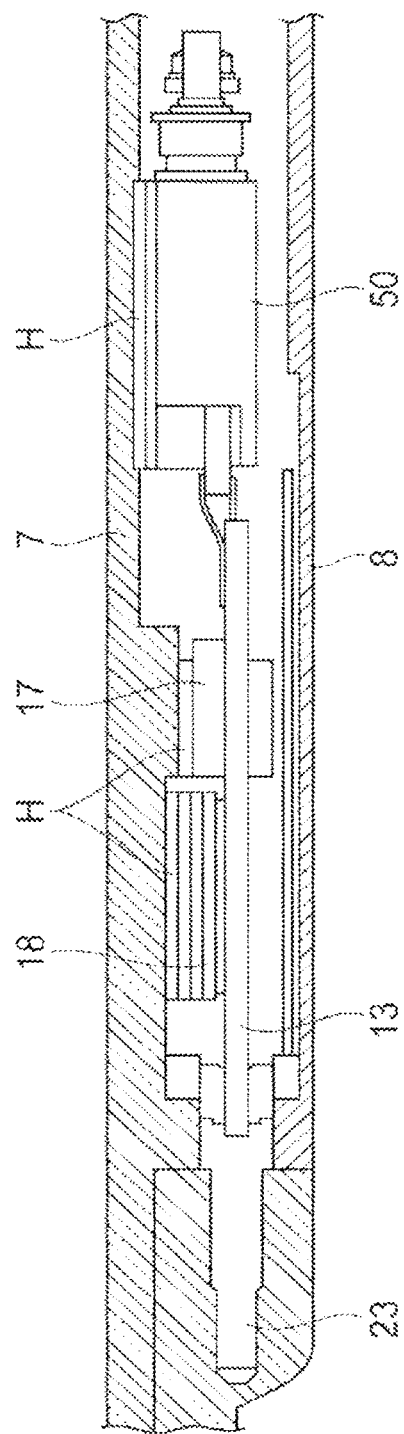
FIG. 13 is a sectional view of the OSA, the circuit board, and a circuit mounted on the circuit board inside a housing.

The circuit components (passive components) mounted on the circuit board 13, such as the OSA 50, the LD driver 17, and the DSP 18, generate Joule's heat according to power consumption when operating by receiving power supply. Thus, as illustrated in FIG. 13, heat dissipation surfaces of the OSA 50, the LD driver 17, and the DSP 18 are disposed at the upper housing 7 side so as to be in surface contact with a heat sink H. Accordingly, a heat dissipation path having high thermal conductivity of the OSA 50, the LD driver 17, and the DSP 18 with respect to the upper housing 7 is constructed.

The circuit board (printed circuit board) 13 has a slight inclination with respect to a horizontal plane (the plane extending front and back and right and left). However, a tolerance of the circuit board 13 caused by the inclination is allowed by a sheet or gel having elasticity and thermal conductivity applied as the heat sink H between the upper housing 7 and the LD driver 17 and between the upper housing 7 and the DSP 18. Accordingly, it is possible to ensure surface contact between the upper face of the OSA 50 and the inner face of the upper housing 7 and from a heat dissipation path having high thermal conductivity.

Figure 14:
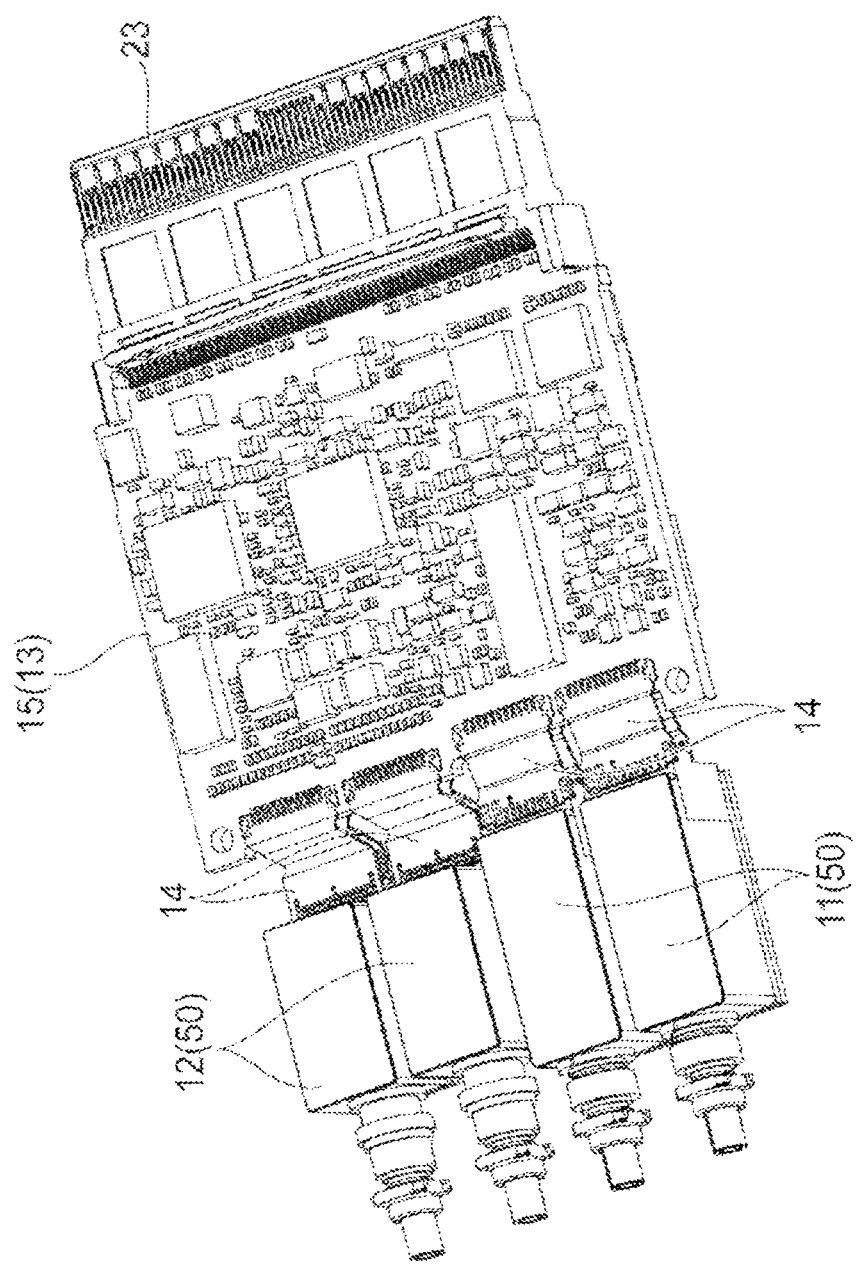
FIG. 14 is a perspective view of the OSAs, the FPCs, and the circuit board.

Next, assembly of the optical transceiver 1 will be described. FIG. 14 illustrates the back face (lower face) of the first circuit board (first printed circuit board) 15 and the top faces of the OSAs 50. First, as illustrated in FIG. 14, the first circuit board 15 and the OSAs 50 are electrically connected to each other (first step). Specifically, the first circuit board 15 with the circuit components already mounted on both faces thereof and each of the OSAs 50 are electrically connected to each other by the FPC 14. At this time, forming is performed on each FPC 14. Specifically, a flexible part of the FPC 14 connected to the ROSA 12 is bent more largely than a flexible part of the FPC 14 connected to the TOSA 11. Then, the FPCs 14 are soldered to the terminals 11b, 12b of the OSAs 50 and a pad of the first circuit board 15 so as to electrically connect the OSAs 50 and the first circuit board 15.

Figure 15:
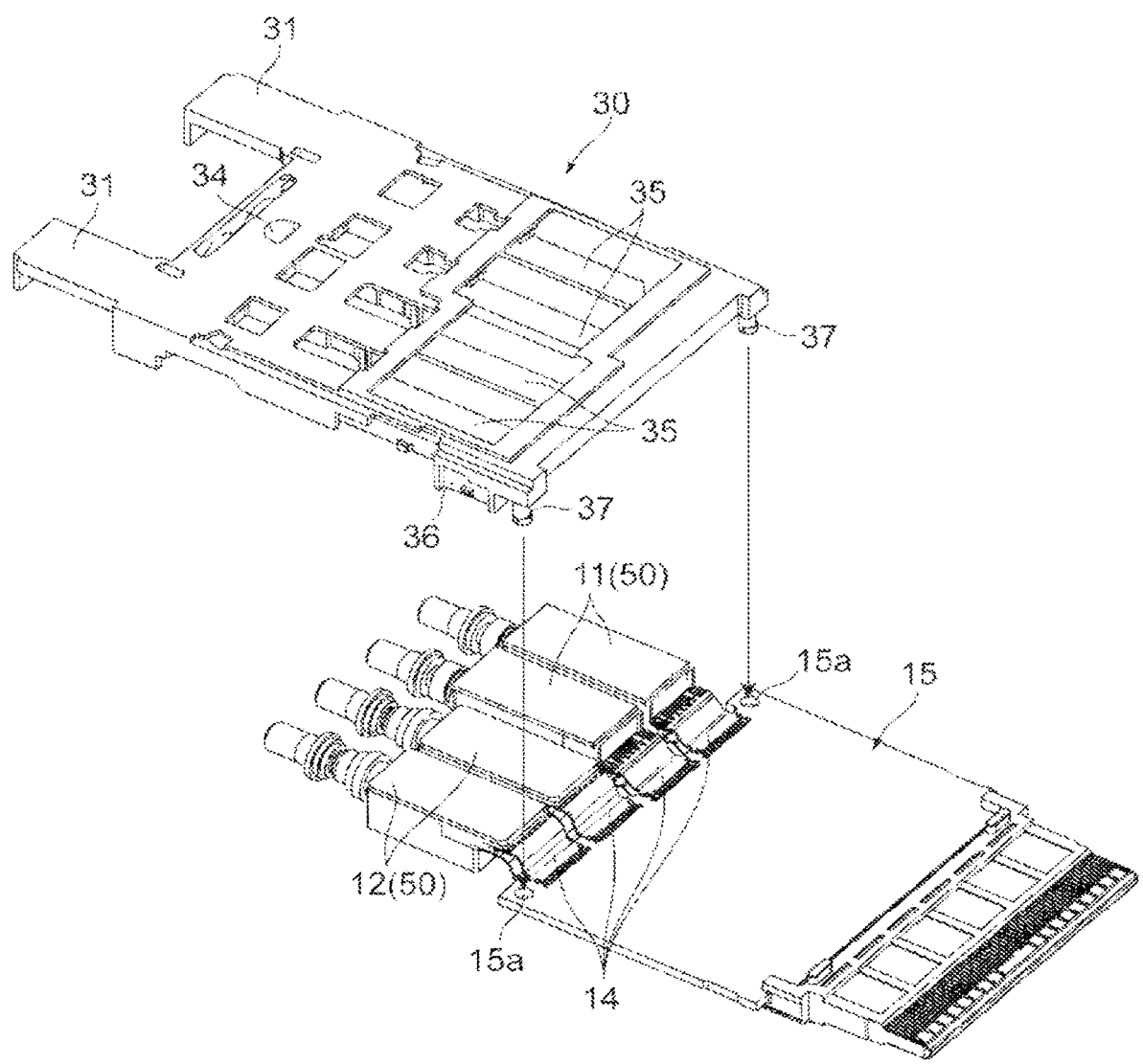
FIG. 15 is a perspective view illustrating a state in which the first holding member is attached to the circuit board of FIG. 14.
Figure 16:
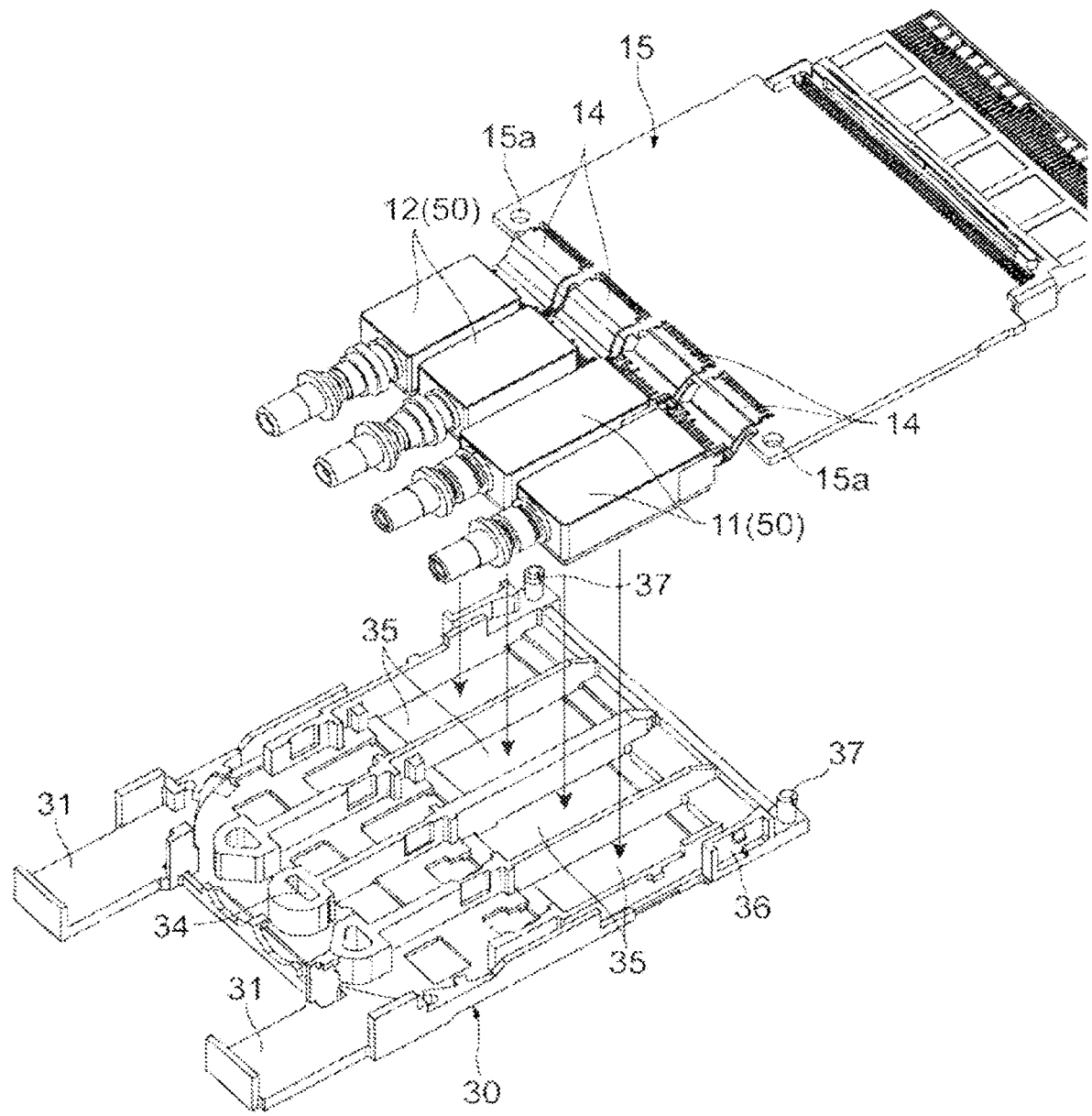
FIG. 16 is a perspective view illustrating a state in which the first holding member is attached to the circuit board of FIG. 14 viewed from the opposite side of FIG. 15.

Next, as illustrated in FIGS. 15 and 16, the projections 37 on the back end of the first holding member 30 are inserted into (fitted with) open holes 15a which are formed on the first circuit board 15. The diameter of the tip of the projection 37 is set larger than the diameter of the open hole 15a so as to prevent the projection 37 from easily coming out of the open hole 15a. Then, each OSA 50 is inserted into the hole 35 of the first holding member 30 so that the bottom face of the OSA 50 is exposed from the hole 35.

Figure 17:
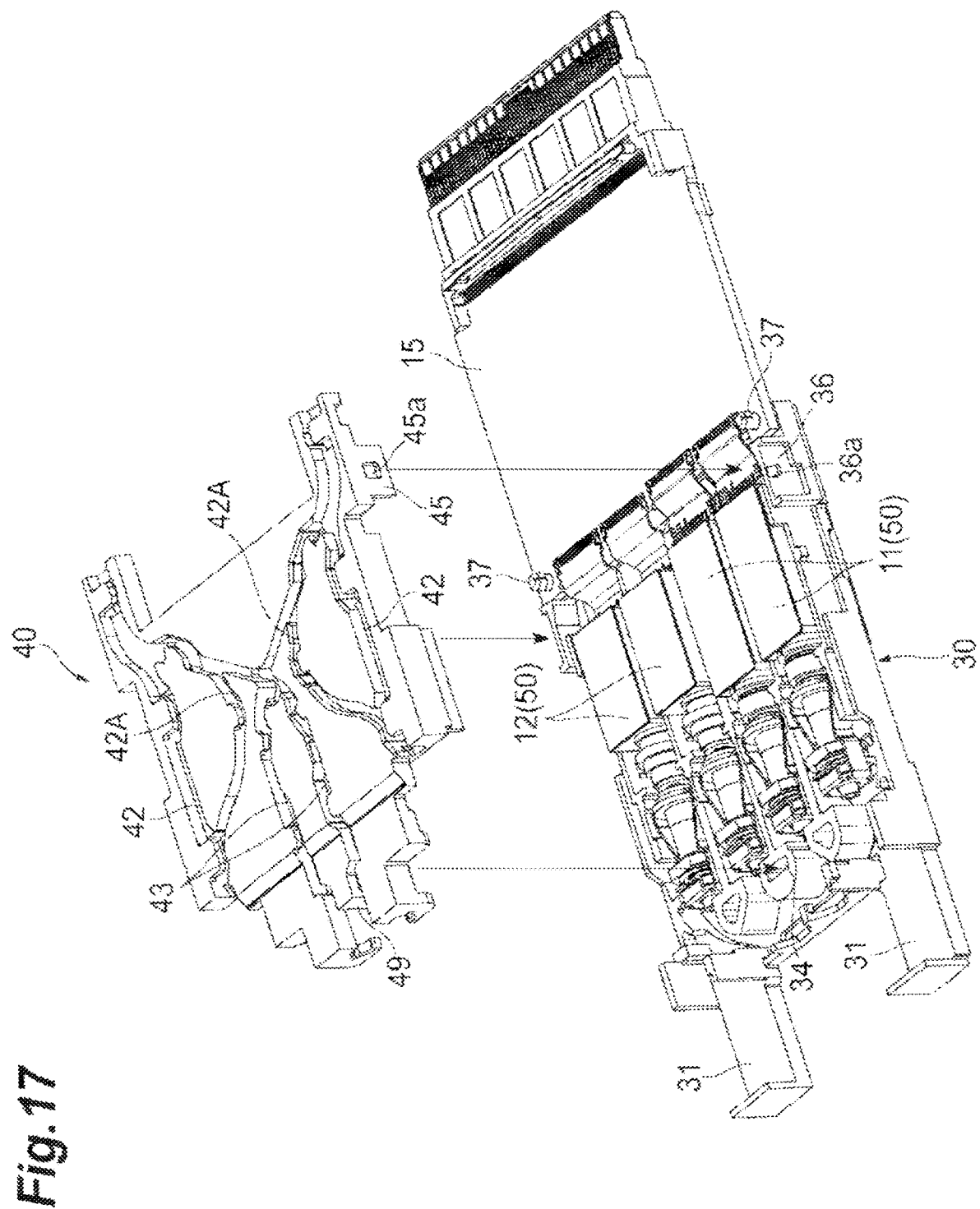
FIG. 17 is a perspective view illustrating a state in which the second holding member is attached to the first holding member of FIG. 16.

As illustrated in FIG. 17, the second holding member 40 is assembled to the first holding member 30. At this time, each projection 36a of the first holding member 30 is fitted with each hole 45a of the second holding member 40. At the same time, the projection 49 of the second holding member 40 is fitted with the hole 34 of the first holding member 30. The second holding member 40 is firmly engaged with the first holding member 30 by these fitting operations.

Then, as illustrated in FIG. 9, the simple connector C connected to the end of the internal fiber F is connected to a sleeve of each OSA 50. Then, the internal fiber F led forward from each simple connector C is housed in the grooves 32, 33 of the first holding member 30 so that the internal fiber F is curved backward and stretched backward up to the circuit board 13. Further, in the circuit board 13, the internal fiber F is bent forward to the opposite side in the right-left direction along the inner side of the outer edge of the circuit board 13.

Figure 18:
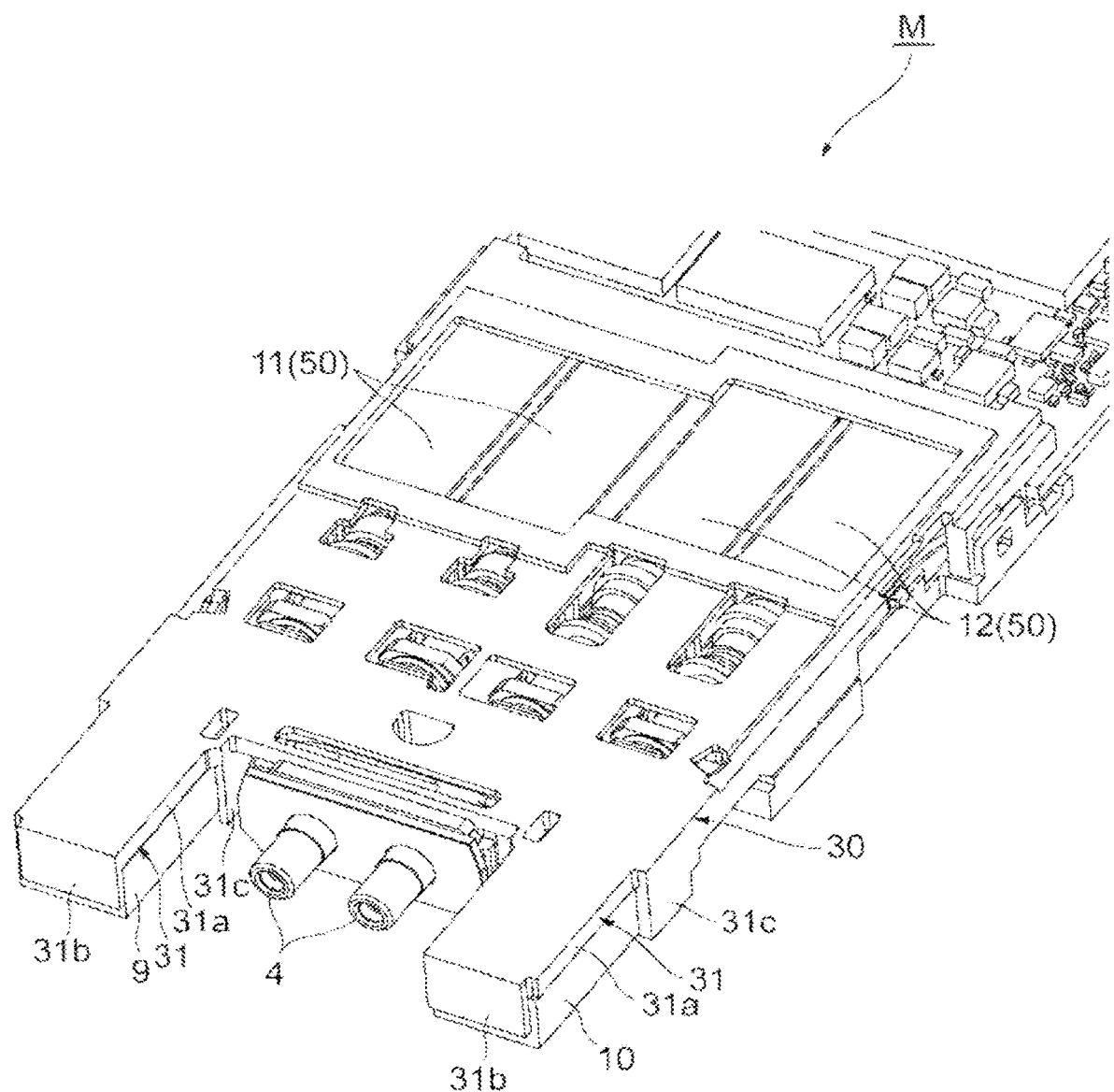
FIG. 18 is a perspective view of an intermediate assembly assembled by temporarily fixing the optical multiplexer (optical demultiplexer) to the first holding member.
Figure 19:
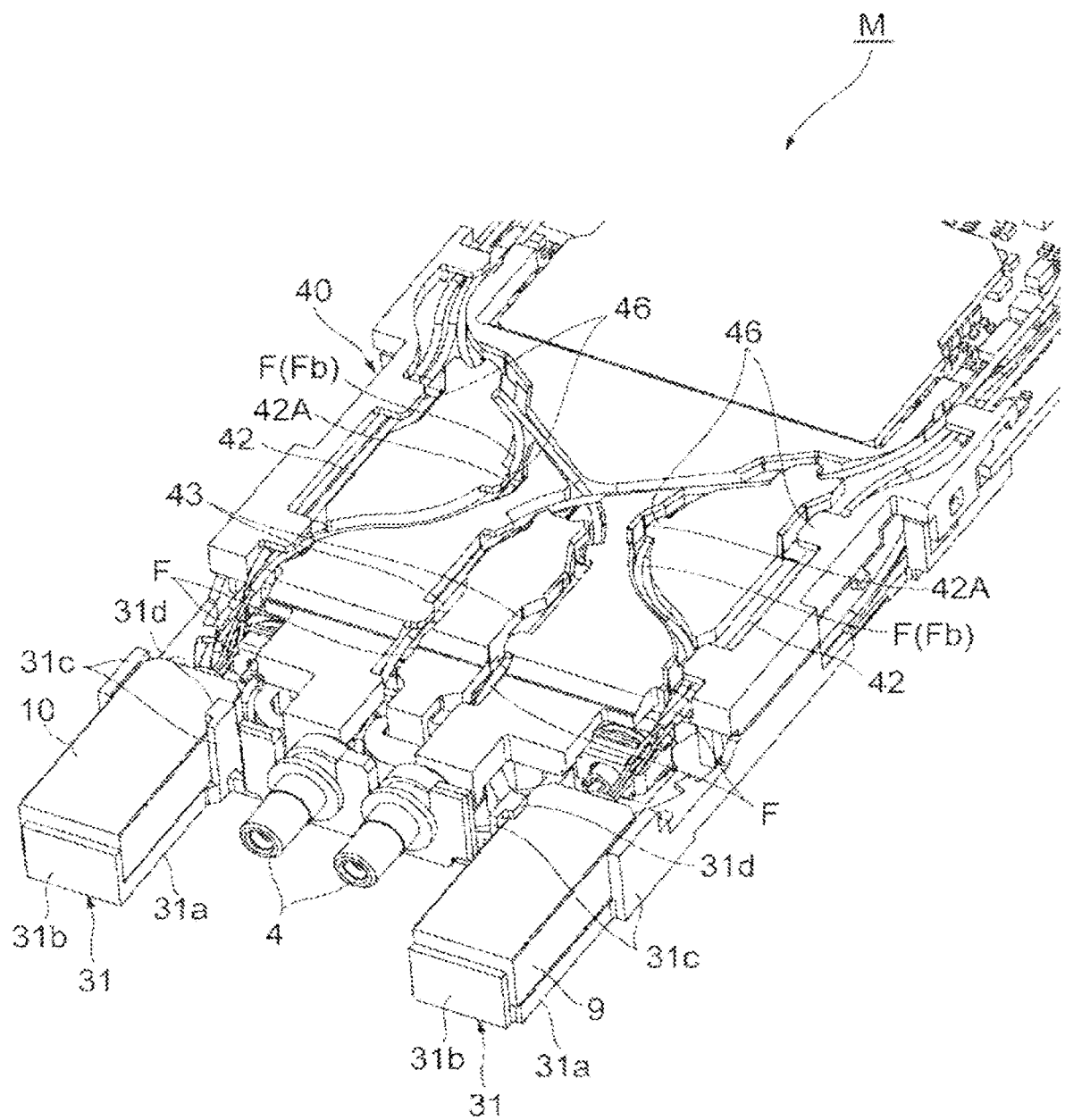
FIG. 19 is a perspective view of the intermediate assembly assembled by temporarily fixing the optical multiplexer (optical demultiplexer) to the first holding member viewed from the opposite side of FIG. 18.

Further, as illustrated in FIGS. 18 and 19, each of the optical multiplexer 9 and the optical demultiplexer 10 is temporarily fixed to the projecting part 31 to hold the optical multiplexer 9 and the optical demultiplexer 10 by the first holding member 30. At this time, each of the optical multiplexer 9 and the optical demultiplexer 10 is placed on the projecting piece 31a of the projecting part 31 and sandwiched between the bent part 31b and the walls 31c to temporarily fix each of the optical multiplexer 9 and the optical demultiplexer 10 on the projecting part 31. Then, the internal fiber F optically connected to the receptacle 4 is housed in the groove 43, and the internal fibers F optically connected to each of the optical multiplexer 9 and the optical demultiplexer 10 are housed in the groove 42.

Figure 20:
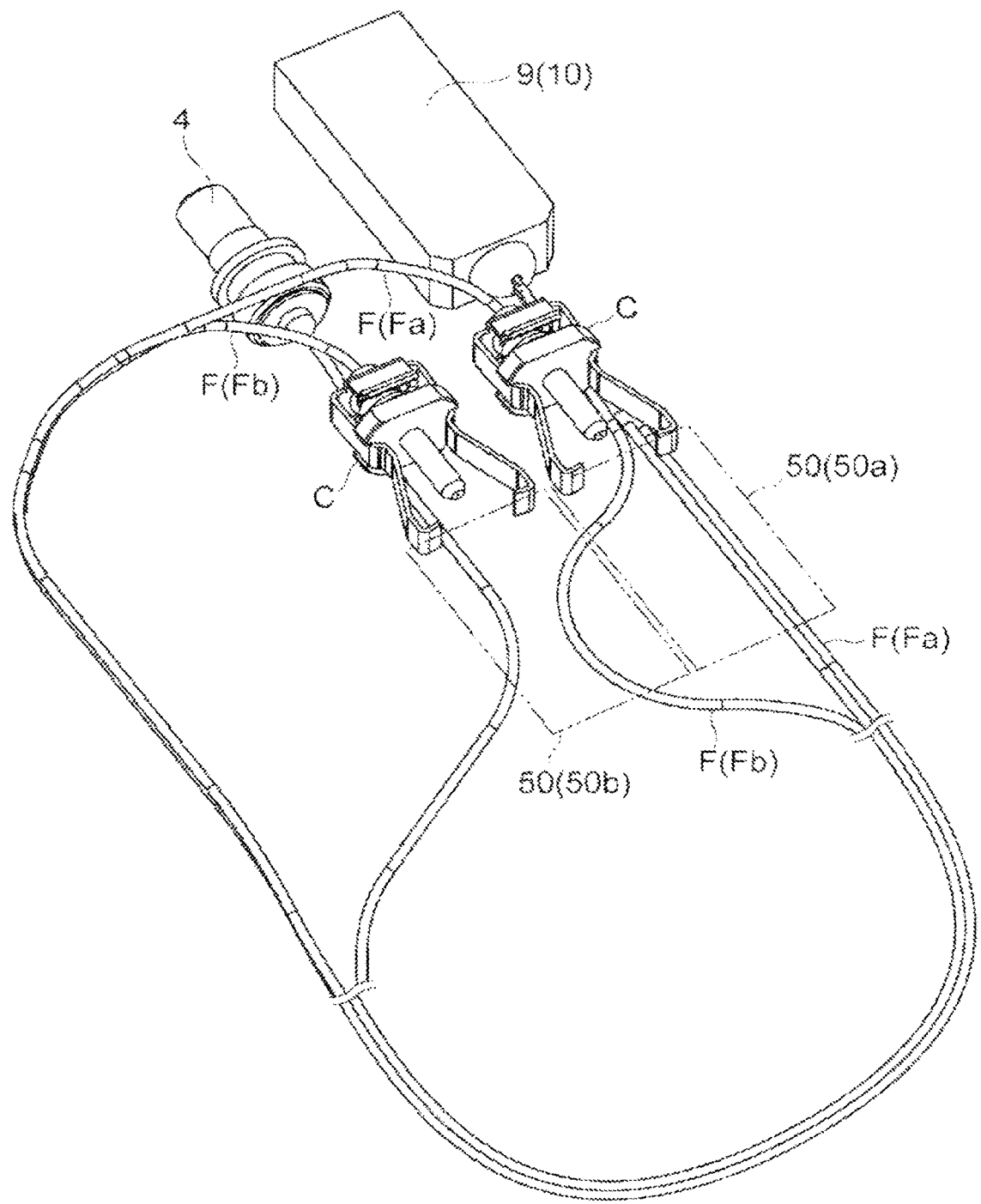
FIG. 20 is a perspective view illustrating part of disposition of the internal fibers in the intermediate assembly of FIG. 19.

FIG. 20 is a perspective view of the internal fibers F inserted into the groove 42. In FIG. 20, only part of the optical multiplexer 9 (optical demultiplexer 10), the internal fiber F, the simple connector C connected to the OSA 50, and the receptacle 4 is illustrated, and the OSA 50 is illustrated in a simplified manner. As illustrated in FIGS. 19 and 20, when the internal fiber F extending from a first OSA 50a (simple connector C) which is located on the outer side in the width direction of the optical transceiver 1 is referred to as an internal fiber Fa, and the internal fiber F extending from a second OSA 50b which is located on the inner side in the width direction of the optical transceiver 1 is referred to as an internal fiber Fb, the internal fiber Fa merges with the internal fiber Fb, and is then routed together with the internal fiber Fb.

The internal fiber Fa extends from the outer side in the width direction of the optical transceiver 1 relative to the internal fiber Fb. Thus, if a path for routing the internal fiber Fa merged with the internal fiber Fb is the same as a path for routing the internal fiber Fb, the length of the internal fiber Fa should be longer than the length of the internal fiber Fb. In this case, it is necessary to prepare the internal fiber Fa and the internal fiber Fb having different lengths, which increases time for assembly and also increases cost. Such a difference in length between the internal fiber Fa and the internal fiber Fb is caused by parallel disposition of the first OSA 50a and the second OSA 50b in lateral direction with respect to longitudinal direction of the housing 2 (perpendicular direction to the longitudinal direction).

On the other hand, in the optical transceiver 1, the path for routing the internal fiber Fa and the path for routing the internal fiber Fb are not the same, and the path of the internal fiber Fb is detoured to the inner side in the width direction of the optical transceiver 1 by the bypass 42A of the groove 42. In this manner, the path of the internal fiber Fb extending from the second OSA 50b which is located on the inner side in the width direction of the optical transceiver 1 is detoured with respect to the path of the internal fiber Fa extending from the first OSA 50a. That is, the internal fiber Fa and the internal fiber Fb having the same length can be used by detouring the path of the internal fiber Fb extending from the second OSA 50b by the bypass 42A. Thus, the internal fiber Fa and the internal fiber Fb can be used in common, which achieves easy assembly and contributes to a reduction in cost.

The assembly performed by inserting the internal fibers F in the groove 42 of the second holding member 40 described above is performed outside the housing 2. Accordingly, it is possible to efficiently assemble the intermediate assembly M including the circuit board 13, the OSAs 50, the simple connectors C, the first holding member 30, the second holding member 40, the optical multiplexer 9, and the optical demultiplexer 10 outside the housing 2. After the intermediate assembly M is assembled, the intermediate assembly M is placed on the upper housing 7, the receptacle 4 is placed on the center in the right-left direction at the front end of the upper housing 7, and the lower housing 8 is assembled to the upper housing 7 to define the position of the receptacle 4. After the assembly of the housing 2 is performed as described above, the assembly of the optical transceiver 1 is completed.

Next, effects obtained by the optical transceiver 1 will be described in detail. In the optical transceiver 1, the external optical connector is received by the receptacle 4, light of the external optical connector is optically coupled to the optical multiplexer/demultiplexer (the optical multiplexer 9 and the optical demultiplexer 10) and each of the OSAs 50. The optical multiplexer/demultiplexer is optically connected to each of the OSAs 50 through each of the internal fibers F. The optical transceiver 1 is provided with the second holding member 40 which holds the OSAs 50 on the circuit board 13. The second holding member 40 includes the bypass 42A which detours any of the internal fibers F. Thus, the second holding member 40 which holds the OSAs 50 can be effectively used as a member that defines the bypass 42A for the internal fiber F.

The lengths of the paths of the internal fibers F (e.g., the internal fiber Fa and the internal fiber Fb) can be made equal to each other by detouring any of the internal fibers F (e.g., the internal fiber Fb) by the bypass 42A. Thus, the internal fibers F having the same length can be used by providing the bypass 42A. Further, since the bypass path of the internal fiber F can be defined, it is possible to eliminate the necessity of largely routing some of the internal fibers F (e.g., the internal fiber Fb having a length equal to the length of the internal fiber Fa). Thus, the internal fibers F can be housed inside the optical transceiver 1 in a compact manner, which offers an advantage for downsizing of the optical transceiver 1.

The bypass 42A is the groove 42 in which the internal fiber F is housed. Thus, the internal fiber F can be easily detoured by housing the internal fiber F in the groove 42. Thus, it is possible to easily perform the assembly of the optical transceiver 1.

The bypass 42A includes the retainer 46 which covers the internal fiber F inserted in the groove 42. The possibility of the internal fiber F coming out of the second holding member 40 can be reduced by covering the internal fiber F inserted in the groove 42 with the retainer 46. Thus, the internal fiber F can be more reliably held by the second holding member 40. Accordingly, it is possible to enhance efficiency and reliability for the assembly of the optical transceiver 1.

The bypass 42A has a shape curved to the inner side in the width direction of the optical transceiver 1. Thus, the bypass 42A enables to detour the internal fiber F in a curved manner to the inner side in the width direction of the optical transceiver 1. Thus, it is possible to prevent the external form of the optical transceiver 1 from becoming large by compactly housing the internal fiber F to the inner side in the width direction of the optical transceiver 1. As a result, the second holding member 40 contributes to downsizing of the optical transceiver 1.

The OSAs 50 include the first OSA 50a and the second OSA 50b. The internal fibers F include the internal fiber Fa and the internal fiber Fb. The optical multiplexer/demultiplexer (the optical multiplexer 9 and the optical demultiplexer 10) is optically connected to the first OSA 50a through the internal fiber Fa and optically connected to the second OSA 50b through the internal fiber Fb. The bypass 42A detours the internal fiber Fb, but does not detour the internal fiber Fa. Thus, it is necessary to prepare the bypass 42A for only one of the internal fiber Fa and the internal fiber Fb, namely, the internal fiber Fb. Thus, it is possible to simplify the configuration of the bypass 42A.

Further, in the present embodiment, the optical multiplexer 9 and the optical demultiplexer 10 are temporarily fixed to the first holding member 30 (the projecting parts 31). Thus, it is possible to relax the stress applied to the bases of the internal fibers F connected to the optical multiplexer 9 and the optical demultiplexer 10, the stress being caused by the own weight of the optical multiplexer 9 and the optical demultiplexer 10.

Further, the assembly performed by housing the internal fibers F in the groove 42 of the second holding member 40 is performed outside the housing 2. The assembly method enables to handle the internal fibers F with high flexibility outside the housing 2. Further, it is possible to prevent routing of the internal fibers F (insertion of the internal fiber F into each groove, bending of the internal fiber F on the circuit board, and the like) from being limited by the housing 2.

Accordingly, when the internal fibers F are routed, the first holding member 30 and the second holding member 40 allows the internal fibers F to efficiently be housed in the grooves 32, 33, 42, 43 thereof.

Further, a component group obtained by the above integration, the component group including the upper housing 7, the lower housing 8, the optical multiplexer 9, the optical demultiplexer 10, the receptacle 4, the first holding member 30, the second holding member 40, the OSAs 50, and the circuit board 13, is unitized. Thus, even when the front and back are inverted (upside down), the positional relationship between the components is maintained. Thus, handling of the component group is easy.

The embodiment of the optical transceiver according to the present disclosure has been described above. However, the present invention is not limited to the above embodiment. That is, it is easily recognized by those skilled in the art that the various modifications and changes can be made within the range of the gist described in the claims. For example, the shapes of the first holding member 30 and the second holding member 40 can be appropriately changed. Further, one holding member may be provided instead of the first holding member 30 and the second holding member 40. Further, the sequence of the assembly of the optical transceiver can be appropriately changed.

The above embodiment describes an example in which the bypass 42A which detours some of the internal fibers F is the groove 42. However, for example, the bypass may be a guide-like wall which stands on the holding member. The shape, the size, the number, and the disposition mode of the bypass can be appropriately changed. The above embodiment describes the bypass 42A which is curved to the inner side in the width direction of the optical transceiver 1. However, for example, the bypass may be curved to the inner side in the longitudinal direction of the optical transceiver, and the position of the bypass can be appropriately changed. Further, the first holding member may be provided with a bypass instead of or in addition to the bypass of the second holding member. The above embodiment describes an example in which the OSAs 50 are the two TOSAs 11 and the two ROSAs 12. However, for example, the optical transceiver 1 may include four TOSAs which are disposed parallel to each other in the lateral direction. In this case, in order to absorb (offset) the difference in length between the internal fibers F connected to the respective TOSAs, the second holding member may include three bypasses having different shapes.

The above embodiment describes the optical transceiver 1 provided with the pull tab 5 which extends forward from both right and left sides of the housing 2. However, for example, a bail which is rotatably supported with respect to the housing may be provided instead of the pull tab. An optical transceiver provided with the bail can obtain effects similar to the effects described above. In this manner, the configuration of each component of the optical transceiver can be appropriately changed.

What is claimed is:

1. An optical transceiver comprising:
   a plurality of optical subassemblies each configured to perform photoelectric conversion between a single optical signal and a single electric signal;
   a circuit board including a circuit mounted thereon, the circuit being electrically connected to each of the optical subassemblies;
   an optical multiplexer/demultiplexer including a plurality of internal fibers, the optical multiplexer/demultiplexer being optically connected to each of the optical subassemblies through each of the internal fibers and configured to multiplex the single optical signal to generate an optical transmission signal or demultiplex an optical reception signal to generate the single optical signal;
   a receptacle optically connected to the optical multiplexer/demultiplexer and configured to transmit the optical transmission signal to an outside and receive the optical reception signal; and
   a holding member configured to hold the optical subassemblies and engaged with the circuit board, wherein
   the holding member includes a first guide configured to guide at least any one of the internal fibers and a second guide configured to detour at least any one of the internal fibers different from the at least one internal fiber guided by the first guide with respect to the first guide,
   the optical subassemblies include a first optical subassembly and a second optical subassembly disposed on an inner side in a lateral direction of the optical transceiver relative to a position of the first optical subassembly,
   the internal fibers include a first internal fiber and a second internal fiber,
   the optical multiplexer/demultiplexer is optically connected to the first optical subassembly through the first internal fiber and optically connected to the second optical subassembly through the second internal fiber,
   the first guide guides the first internal fiber,
   the second guide guides the second internal fiber, and
   a length of the first internal fiber is set equal to a length of the second internal fiber.

2. The optical transceiver according to claim 1, wherein the first guide and the second guide are configured as grooves both formed within one face of the holding member and capable of housing the internal fibers.

3. The optical transceiver according to claim 2, wherein the first guide has a first length for guiding the at least any one of the internal fibers and the second guide has a second length for guiding the at least any one of the internal fibers different from the at least one internal fiber guided by the first guide, and
   wherein the second length is set to be longer than the first length.

4. The optical transceiver according to claim 3, wherein each of the first guide and the second guide includes a retainer configured to cover the internal fibers housed in the grooves.

5. The optical transceiver according to claim 1, wherein the first guide has a straight shape extending in a longitudinal direction of the optical transceiver, and
   the second guide is disposed on an inner side relative to the first guide in a width direction of the optical transceiver and has a shape curved toward a center line in the width direction of the optical transceiver.

* * * * *